US012256095B2

(12) United States Patent
Fang

(10) Patent No.: US 12,256,095 B2
(45) Date of Patent: Mar. 18, 2025

(54) DECODING METHODS AND DEVICES, AND ENCODING METHODS AND DEVICES

(71) Applicant: HANGZHOU HIKVISION DIGITAL TECHNOLOGY CO., LTD., Zhejiang (CN)

(72) Inventor: Shuqing Fang, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 274 days.

(21) Appl. No.: 17/952,193

(22) Filed: Sep. 23, 2022

(65) Prior Publication Data

US 2023/0013243 A1     Jan. 19, 2023

Related U.S. Application Data

(63) Continuation of application No. PCT/CN2021/082954, filed on Mar. 25, 2021.

(30) Foreign Application Priority Data

Mar. 26, 2020  (CN) .......................... 202010225428.1

(51) Int. Cl.
*H04N 19/52* (2014.01)
*H04N 19/176* (2014.01)
*H04N 19/577* (2014.01)

(52) U.S. Cl.
CPC ........... *H04N 19/52* (2014.11); *H04N 19/176* (2014.11); *H04N 19/577* (2014.11)

(58) Field of Classification Search
CPC ..... H04N 19/176; H04N 19/52; H04N 19/577
See application file for complete search history.

(56) References Cited

U.S. PATENT DOCUMENTS

2020/0007864 A1   1/2020 Li et al.
2020/0084450 A1   3/2020 Li et al.
(Continued)

FOREIGN PATENT DOCUMENTS

CN     101502120 A    8/2009
CN     103959776 A    7/2014
(Continued)

OTHER PUBLICATIONS

S. Wang, Z. Wang, F. Luo, S. Wang, S. Ma and W. Gao, "Enhanced Motion Vector Prediction for Video Coding," 2018 IEEE Fourth International Conference on Multimedia Big Data (BigMM), Xi'an, China, 2018, pp. 1-5, doi: 10.1109/BigMM.2018.8499100. (Year: 2018).*

(Continued)

*Primary Examiner* — Jeremiah C Hallenbeck-Huber
(74) *Attorney, Agent, or Firm* — Ladas & Parry, LLP

(57) ABSTRACT

The present disclosure provides decoding methods, encoding methods, apparatuses and devices. A decoding method includes: obtaining index information of an enhanced temporal motion vector prediction mode from a bit stream of a current block when it is determined that an enhanced temporal motion vector prediction technology is enabled for the current block; determining one or more matching blocks of the current block; determining candidate enhanced temporal motion vector prediction modes based on the one or more matching blocks and one or more new matching blocks obtained by offsetting each of the one or more matching blocks, and establishing a temporal candidate mode list; determining the enhanced temporal motion vector prediction mode based on the index information; determining motion information of each sub-block in the current block based on the enhanced temporal motion vector prediction mode, and (Continued)

performing motion compensation on each sub-block in the current block.

18 Claims, 9 Drawing Sheets

(56) References Cited

U.S. PATENT DOCUMENTS

| | | | |
|---|---|---|---|
| 2021/0266560 A1* | 8/2021 | Jang | H04N 19/52 |
| 2022/0070448 A1* | 3/2022 | Kim | H04N 19/70 |

FOREIGN PATENT DOCUMENTS

| | | |
|---|---|---|
| CN | 107071461 A | 8/2017 |
| CN | 107113424 A | 8/2017 |
| CN | 108632616 A | 10/2018 |
| CN | 109963155 A | 7/2019 |
| CN | 110225346 A | 9/2019 |
| CN | 110662075 A | 1/2020 |
| CN | 110740317 A | 1/2020 |
| CN | 110858906 A | 3/2020 |
| CN | 110868602 A | 3/2020 |
| JP | 7375223 B2 | 11/2023 |
| WO | 2016078511 A1 | 5/2016 |
| WO | 2017204532 A1 | 11/2017 |
| WO | 2018105580 A1 | 6/2018 |
| WO | 2019199563 A1 | 10/2019 |
| WO | 2020003255 A1 | 1/2020 |
| WO | 2020003259 A1 | 1/2020 |
| WO | 2020004990 A1 | 1/2020 |
| WO | 2020017892 A1 | 1/2020 |

OTHER PUBLICATIONS

Ruoyang Yu et al,"CE2-related: ATMVP simplification", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0116, 5 pages.

Jianle Chen et al,"Algorithm Description of Joint Exploration Test Model 7 (JEM 7)", Joint Video Exploration Team (JVET) of ITU-T SG 16 WP 3 and ISO/IEC JTC 1/SC 29/WG 11,7th Meeting: Torino, IT, Jul. 13-21, 2017, Document: JVET-G1001-v1, 50 pages.

Jian-Liang Lin, et al., "Motion Vector Coding in the HEVC Standard", IEEE Journal of Selected Topics in Signal Processing, vol. 7, No. 6, Dec. 2013, 12 pages.

International Search Report for PCT/CN2021/082954 mailed on Jun. 18, 2021 and its English translation provided by WIPO.

Written Opinion of the International Searching Authority for PCT/CN2021/082954 mailed on Jun. 18, 2021 and its English translation provided by Google Translate.

State Intellectual Property Office of the People's Republic of China, $1^{st}$ Office Action and Search Report Issued in Application No. 2020102254281, Feb. 17, 2022, 17 pages.(Submitted with Machine/Partial Translation).

Huanbang Chen et al, "Non-CE4: ATMVP simplification," Joint Video Experts Team (JVET) of ITU-T SG 16 WP 3 and ISO/IEC JTC 1/SC 29/WG 11, 11th Meeting: Ljubljana, SI, 10, Jul. 10, 2018, all pages.

Japanese Patent Office, Office Action Issued in corresponding Japanese Patent Application No. 2023-182870, Aug. 13, 2024, 8 pages. (Submitted with Machine Translation).

* cited by examiner

DECODING METHODS AND DEVICES, AND ENCODING METHODS AND DEVICES

CROSS REFERENCE TO RELATED APPLICATIONS

This application is a continuation application of International Application No. PCT/CN2021/082954 filed on Mar. 25, 2021, which claims priority to a Chinese Patent Application No. 202010225428.1 filed on Mar. 26, 2020, the entire contents of which are incorporated herein by reference.

TECHNICAL FIELD

The present disclosure relates to video encoding and decoding technologies, in particular to decoding methods, encoding methods, apparatuses and devices.

BACKGROUND

Complete video coding generally includes operations such as prediction, transformation, quantization, entropy coding, and filtering. Prediction can be divided into intra prediction and inter prediction. Intra prediction is a prediction using surrounding coded blocks as a reference to predict a current uncoded block to effectively remove redundancy in a spatial domain. Inter prediction is a prediction using adjacent coded images to predict a current image to effectively remove redundancy in a temporal domain.

An Alternative Temporal Motion Vector Prediction (ATMVP) technology adopted in the Versatile Video Coding (VVC) standard is to provide different motion information for each sub-block in a current coding unit by using motion information of sub-blocks in the temporal domain.

However, it is found in practice that, in the ATMVP technology, searching for an image block at a corresponding position of a current block in a co-located picture needs to depend on motion information of surrounding blocks of the current block. If the motion information of the surrounding blocks is not accurate, motion information of the searched image block at the corresponding position will be unreliable, thus affecting the coding performance.

SUMMARY

In view of this, the present disclosure provides decoding methods, encoding methods, apparatuses and devices.

According to a first aspect of embodiments of the present disclosure, there is provided a decoding method, including:
obtaining index information of an enhanced temporal motion vector prediction mode from a bit stream of a current block when it is determined that an enhanced temporal motion vector prediction technology is enabled for the current block;
determining one or more matching blocks of the current block, including:
determining one or more matching blocks of the current block at least based on a target reference picture index, a target reference direction and a position of the current block, where the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1;
determining candidate enhanced temporal motion vector prediction modes based on the one or more matching blocks and one or more new matching blocks obtained by offsetting each of the one or more matching blocks, and establishing a temporal candidate mode list based on the candidate enhanced temporal motion vector prediction modes;
based on the index information, determining the enhanced temporal motion vector prediction mode from the temporal candidate mode list;
determining motion information of each sub-block in the current block based on the determined enhanced temporal motion vector prediction mode, and performing motion compensation on each sub-block in the current block based on the motion information of each sub-block in the current block,
where, determining the motion information of each sub-block in the current block based on the determined enhanced temporal motion vector prediction mode, includes:
for any sub-block in a target matching block, if both forward motion information and backward motion information of the sub-block are available, scaling the forward motion information and the backward motion information of the sub-block to the first picture in reference picture List0 and the first picture in reference picture List1 respectively, and assigning the scaled forward motion information and the scaled backward motion information to a sub-block at a corresponding position in the current block; or
if forward motion information of the sub-block is available but backward motion information of the sub-block is unavailable, scaling the forward motion information of the sub-block to the first picture in reference picture List0, and assigning the scaled forward motion information to a sub-block at a corresponding position in the current block; or
if backward motion information of the sub-block is available but forward motion information of the sub-block is unavailable, scaling the backward motion information of the sub-block to the first picture in reference picture List1, and assigning the scaled backward motion information to a sub-block at a corresponding position in the current block,
where a sequence parameter set level syntax is used to indicate whether the enhanced temporal motion vector prediction technology is enabled for the current block.

According to a second aspect of the embodiments of the present disclosure, there is provided an encoding method, including:
determining one or more matching blocks of a current block, including:
determining one or more matching blocks of the current block at least based on a target reference picture index, a target reference direction and a position of the current block, where the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1;
determining candidate enhanced temporal motion vector prediction modes based on the one or more matching blocks and one or more new matching blocks obtained by offsetting each of the one or more matching blocks, and establishing a temporal candidate mode list based on the candidate enhanced temporal motion vector prediction modes;

traversing the candidate enhanced temporal motion vector prediction modes in the temporal candidate mode list, and for any of the candidate enhanced temporal motion vector prediction modes, determining motion information of each sub-block in the current block based on the candidate enhanced temporal motion vector prediction mode, and performing motion compensation on each sub-block in the current block based on the motion information of each sub-block in the current block, where, determining the motion information of each sub-block in the current block based on the candidate enhanced temporal motion vector prediction mode, includes:

for any sub-block in a target matching block, if both forward motion information and backward motion information of the sub-block are available, scaling the forward motion information and the backward motion information of the sub-block to the first picture in reference picture List0 and the first picture in reference picture List1 respectively, and assigning the scaled forward motion information and the scaled backward motion information to a sub-block at a corresponding position in the current block; or if forward motion information of the sub-block is available but backward motion information of the sub-block is unavailable, scaling the forward motion information of the sub-block to the first picture in reference picture List0, and assigning the scaled forward motion information to a sub-block at a corresponding position in the current block; or if backward motion information of the sub-block is available but forward motion information of the sub-block is unavailable, scaling the backward motion information of the sub-block to the first picture in reference picture List1, and assigning the scaled backward motion information to a sub-block at a corresponding position in the current block, determining, based on a rate-distortion cost corresponding to each candidate enhanced temporal motion vector prediction mode in the temporal candidate mode list, a candidate enhanced temporal motion vector prediction mode with a smallest rate-distortion cost as an enhanced temporal motion vector prediction mode of the current block;

carrying index information in a bit stream of the current block, where the index information is used to indicate a mode index of the determined enhanced temporal motion vector prediction mode.

According to a third aspect of the embodiments of the present disclosure, there is provided a decoding apparatus, including:

a decoding unit, configured to obtain index information of an enhanced temporal motion vector prediction mode from a bit stream of a current block when it is determined that an enhanced temporal motion vector prediction technology is enabled for the current block;

a first determining unit, configured to determine one or more matching blocks of the current block;

an establishing unit, configured to determine candidate enhanced temporal motion vector prediction modes based on the one or more matching blocks and one or more new matching blocks obtained by offsetting each of the one or more matching blocks, and establish a temporal candidate mode list based on the candidate enhanced temporal motion vector prediction modes;

a second determining unit, configured to determine, based on the index information of the enhanced temporal motion vector prediction mode, the enhanced temporal motion vector prediction mode from the temporal candidate mode list;

a predicting unit, configured to determine motion information of each sub-block in the current block based on the enhanced temporal motion vector prediction mode, and perform motion compensation on each sub-block in the current block based on the motion information of each sub-block in the current block, where the predicting unit is further configured to:

for any sub-block in a target matching block, if both forward motion information and backward motion information of the sub-block are available, scale the forward motion information and the backward motion information of the sub-block to the first picture in reference picture List0 and the first picture in reference picture List1 respectively, and assign the scaled forward motion information and the scaled backward motion information to a sub-block at a corresponding position in the current block; or if forward motion information of the sub-block is available but backward motion information of the sub-block is unavailable, scale the forward motion information of the sub-block to the first picture in reference picture List0, and assign the scaled forward motion information to a sub-block at a corresponding position in the current block; or if backward motion information of the sub-block is available but forward motion information of the sub-block is unavailable, scale the backward motion information of the sub-block to the first picture in reference picture List1, and assign the scaled backward motion information to a sub-block at a corresponding position in the current block, where a sequence parameter set level syntax is used to indicate whether the enhanced temporal motion vector prediction technology is enabled for the current block, where, when determining the one or more matching blocks of the current block, the first determining unit is further configured to: determine the one or more matching blocks of the current block at least based on a target reference picture index, a target reference direction and a position of the current block, where the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1.

According to a fourth aspect of the embodiments of the present disclosure, there is provided an encoding device, including:

a first determining unit, configured to determine one or more matching blocks of a current block;

an establishing unit, configured to determine candidate enhanced temporal motion vector prediction modes based on the one or more matching blocks and one or more new matching blocks obtained by offsetting each of the matching blocks, and establish a first temporal candidate mode list based on the candidate enhanced temporal motion vector prediction modes;

a predicting unit, configured to traverse the candidate enhanced temporal motion vector prediction modes in the first temporal candidate mode list, and for any of the candidate enhanced temporal motion vector prediction modes, determine motion information of each sub-block in the current block based on the candidate enhanced temporal motion vector prediction mode, and perform motion compensation on each sub-block in the current block based on the motion information of each sub-block in the current block, where the predicting unit is further configured to:

for any sub-block in a target candidate matching block, if both forward motion information and backward motion information of the sub-block are available, scale the forward motion information and the backward motion information of the sub-block to the first picture in reference picture List0 and the first picture in reference picture List1 respectively, and assign the scaled forward motion information and the scaled backward motion information to a sub-block at a corresponding position in the current block; or if forward motion information of the sub-block is available but backward motion information of the sub-block is unavailable, scale the forward motion information of the sub-block to the first picture in reference picture List0, and assign the scaled forward motion information to a sub-block at a corresponding position in the current block; or if backward motion information of the sub-block is available but forward motion information of the sub-block is unavailable, scale the backward motion information of the sub-block to the first picture in reference picture List1, and assign the scaled backward motion information to a sub-block at a corresponding position in the current block, a second determining unit, configured to determine, based on a rate-distortion cost corresponding to each candidate enhanced temporal motion vector prediction mode in the temporal candidate mode list, a candidate enhanced temporal motion vector prediction mode with a smallest rate-distortion cost as an enhanced temporal motion vector prediction mode of the current block;

an encoding unit, configured to carry index information in a bit stream of the current block, where the index information is used to indicate a mode index of the determined enhanced temporal motion vector prediction mode, where, when determining the one or more matching blocks of the current block, the first determining unit is further configured to: determine the one or more matching blocks of the current block at least based on a target reference picture index, a target reference direction and a position of the current block, where the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1.

According to a fifth aspect of the embodiments of the present disclosure, there is provided a decoding device, including a processor and a machine-readable storage medium, where the machine-readable storage medium stores machine-executable instructions that can be executed by the processor, and the processor is configured to execute the machine-executable instructions to implement any one of the above decoding methods.

According to a sixth aspect of the embodiments of the present disclosure, there is provided an encoding device, including a processor and a machine-readable storage medium, where the machine-readable storage medium stores machine-executable instructions that can be executed by the processor, and the processor is configured to execute the machine-executable instructions to implement any one of the above encoding methods.

In the decoding method of the embodiment of the present disclosure, when it is determined that an enhanced temporal motion vector prediction technology is enabled for a current block, index information of an enhanced temporal motion vector prediction mode is obtained from a bit stream of the current block; one or more matching blocks of the current block are determined; candidate enhanced temporal motion vector prediction modes are determined based on the one or more matching blocks and one or more new matching blocks obtained by offsetting each of the one or more matching blocks, and a temporal candidate mode list is established based on the candidate enhanced temporal motion vector prediction modes; based on the index information, the enhanced temporal motion vector prediction mode is determined from the temporal candidate mode list; motion information of each sub-block in the current block is determined based on the enhanced temporal motion vector prediction mode, and motion compensation is performed on each sub-block in the current block based on the motion information of each sub-block in the current block. The probability of inaccurate motion information of the matching block caused by inaccurate motion information of the surrounding block is reduced, and the decoding performance is improved.

DETAILED DESCRIPTION OF THE EMBODIMENTS

Figure 1A:
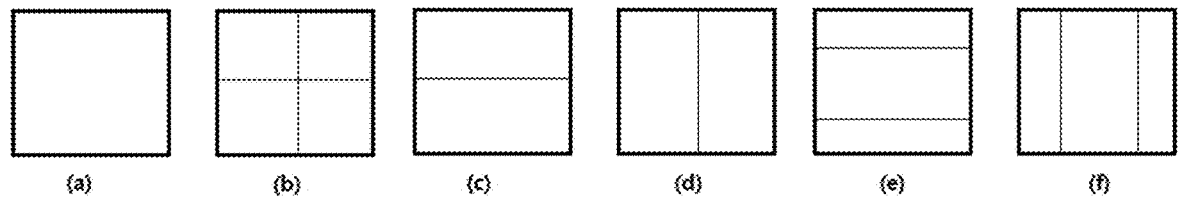
FIGS. 1A to 1B are schematic diagrams illustrating block partition according to an exemplary embodiment of the present disclosure.

The terms used in embodiments of the present disclosure are only for the purpose of describing specific examples, rather than limiting the present disclosure. The singular forms "a", "said" and "the" used in the embodiments and claims of the present disclosure are also intended to include plural forms, unless the context clearly indicates otherwise. It should also be understood that the term "and/or" as used herein refers to any one or all possible combinations of one or more associated listed items. It should be understood that although the terms first, second, third, etc. can be used in the embodiments of the present disclosure to describe various information, these information should not be limited by these terms. These terms are only used to distinguish the same type of information from each other. For example, without departing from the scope of the present disclosure, the first information can also be referred to as second information, and similarly, the second information can also be referred to as first information. In addition, the word "if" used can be interpreted as "upon", "when" or "in response to".

Exemplary embodiments will be described in detail herein, examples of which are illustrated in the accompanying drawings. When the following description refers to the drawings, the same numerals in different drawings refer to the same or similar elements unless otherwise indicated. The implementations described in the exemplary embodiments below do not represent all implementations consistent with the present disclosure. On the contrary, they are merely examples of devices and methods consistent with some aspects of the present disclosure as recited in the appended claims.

The terms used in the present disclosure are only for the purpose of describing specific examples, rather than limiting the present disclosure. The singular forms "a", "said" and "the" used in the present disclosure and the appended claims are also intended to include plural forms, unless the context clearly indicates otherwise.

In order to make those skilled in the art better understand technical solutions provided by the embodiments of the present disclosure, some technical terms involved in the embodiments of the present disclosure and the main process of existing video encoding and decoding are briefly described below.

In order to make those skilled in the art better understand the technical solutions provided by the embodiments of the present disclosure, some technical terms involved in the embodiments of the present disclosure will be briefly described below.

Technical Terms

1. Prediction Pixel (also referred to as Prediction Signal): the prediction pixel refers to a pixel value derived from a pixel which has been encoded and decoded, a residual is obtained through a difference between an original pixel and the prediction pixel, and then residual transformation, quantization and coefficient encoding are performed.

In an example, the prediction pixel in inter prediction refer to a pixel value derived from a reference picture (reconstructed pixel picture) for a current block. The final prediction pixel needs to be obtained through interpolation due to discrete pixel positions. The closer the prediction pixel is to the original pixel, the smaller the residual energy obtained by subtracting the prediction pixel from the original pixel is, and the higher the encoding compression performance is.

2. Motion Vector (MV): in inter encoding, the motion vector is used to indicate a relative displacement between a current block and an optimal matching block in a reference image of the current block. Each block (which can be referred to as a sub-block) obtained by partition has a corresponding motion vector that needs to be transmitted to a decoding side. If the motion vector of each sub-block is independently encoded and transmitted, especially in the case of a large number of sub-blocks, a considerable number of bits will be consumed. In order to reduce the number of bits for encoding the motion vector, the spatial correlation between adjacent image blocks is used in video coding to predict the motion vector of the current block to be encoded according to motion vectors of adjacent encoded blocks, and then a prediction difference is encoded. Thus, the number of bits representing the motion vector can be effectively reduced. Based on this, in the process of encoding the motion vector of the current block, generally, the motion vector of the current block is predicted by using the motion vectors of the adjacent encoded blocks, and then a difference between a Motion Vector Prediction (MVP) and a real estimated value of the motion vector, that is, Motion Vector Difference (MVD), is encoded, thus effectively reducing the number of bits for encoding the motion vector.

3. Motion Information: since the motion vector indicates a relative displacement between a current block and an optimal matching block in a certain reference image, in order to accurately obtain information pointing to the image block, in addition to motion vector information, index information of the reference image is required to indicate which reference image is used. In the video encoding technology, for a current image, a reference image list may be generally established based on certain rules, and an index of the reference image indicates which reference image in the reference image list is adopted by the current block. In addition, the encoding technology can also support a plurality of reference image lists, and therefore, an index, which can be referred to as a reference direction, is also required to indicate which reference image list is used. In video encoding, information related to motion, such as a motion vector, a reference picture index, and a reference direction, may be collectively referred to as motion information.

4. Rate-Distortion Optimized (RDO): indicators for evaluating encoding efficiency include: bit rate (also referred to bit per second, BPS) and peak signal to noise ratio (PSNR). The smaller the bit rate is, the greater the compression rate is; the greater the PSNR is, the better the quality of a reconstructed image is. Selection of an encoding mode is usually based on a comprehensive evaluation of the two indicators.

For example, the cost corresponding to the encoding mode can be calculated according to the following formula: $J(mode)=D+\lambda*R$, where D represents a distortion, usually measured by a Sum of Square Error (SSE) between a reconstructed block and a source image block; λ represents a Lagrangian multiplier; R represents an actual number of bits required for encoding an image block in this encoding mode, including a total number of bits required for encoding mode information, motion information, and prediction residuals.

When selecting an encoding mode, if RDO principle is used to make a comparison decision on the encoding mode, a better coding performance can usually be guaranteed.

The block partition technology in the existing video coding standard and the main process of the existing video encoding and decoding will be briefly described below.

Figure 1B:
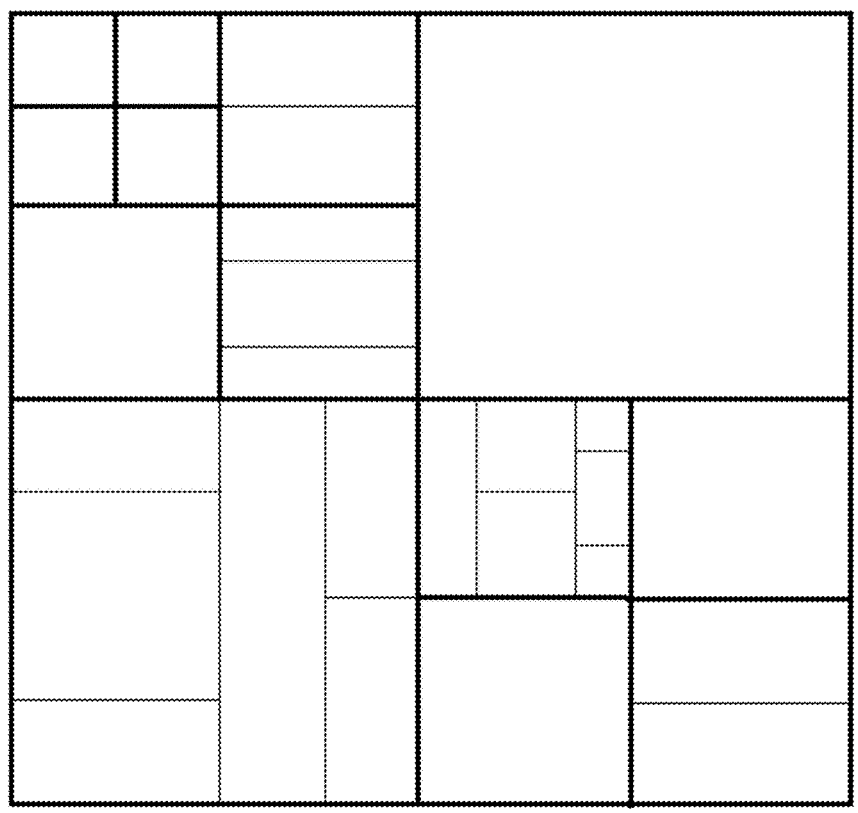

Block Partition Technology in Video Coding Standard:

In High Efficiency Video Coding (HEVC), for example, a Coding Tree Unit (CTU) is recursively partitioned into Coding Units (CUs) using a quadtree. As shown in FIG. 1A and FIG. 1B, an un-partitioned coding tree unit is a Largest Coding Unit (LCU). The CTU mentioned below can be used interchangeably with the LCU. Whether to use intra encoding or inter encoding is determined at a leaf node CU level. The CU can be further partitioned into two or four Predicting Units (PUs), and the same prediction information is used in the same PU. After the prediction is completed and residual information is obtained, a CU can be further partitioned into a plurality of Transform Units (TUs) using a quadtree. For example, the current block in the present disclosure is a PU.

However, in newly proposed Versatile Video Coding (VVC), the block partition technology has undergone major changes. A partition structure with a mixture of binary tree/ternary tree/quadtree replaces the original partition mode, distinction between the original concepts of CU, PU, and TU is eliminated, and a more flexible way of partitioning CU is supported. The CU can be partitioned by square partition or rectangular partition. The CTU is first partitioned using a quadtree, and then leaf nodes obtained by the quadtree partition can be further partitioned using a binary tree and a ternary tree. As shown in FIG. 1A, there are five types of partitioning a CU, respectively quadtree partition, horizontal binary tree partition, vertical binary tree partition, horizontal ternary tree partition and vertical ternary tree partition. As shown in FIG. 1B, CU partition within a CTU can be any combination of the above five partition types, so that shapes of PUs are different, such as rectangles and squares of different sizes.

Figure 2:
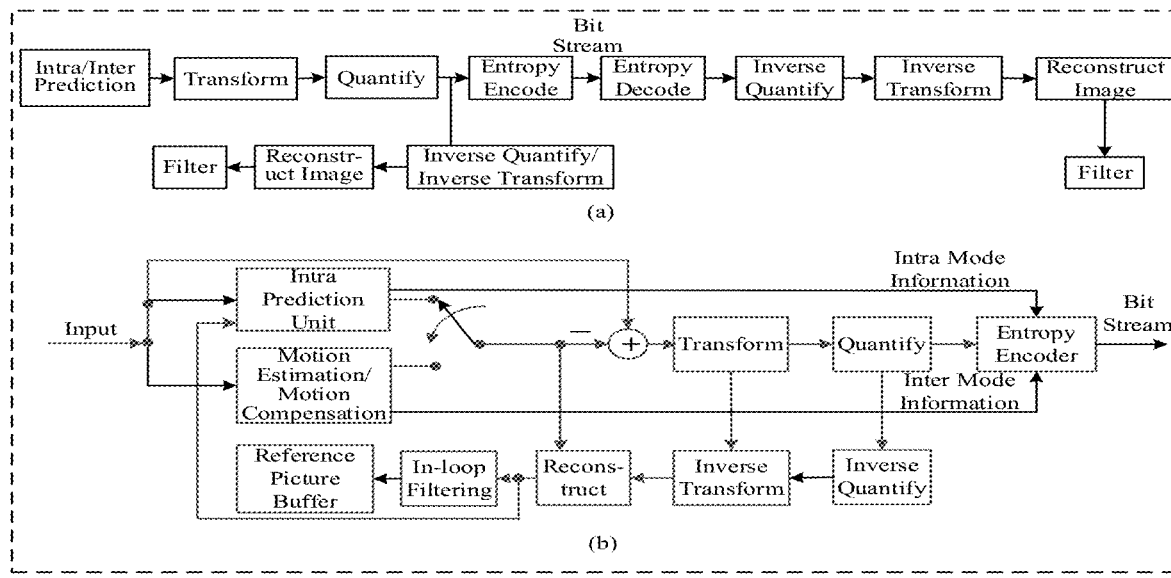
FIG. 2 is a schematic diagram illustrating an encoding and decoding method according to an exemplary embodiment of the present disclosure.

The main process of video encoding and decoding:

Please refer to (a) in FIG. 2, taking video encoding as an example, video encoding generally includes processes such as prediction, transformation, quantization, and entropy coding. Further, the encoding process can also be implemented according to the framework of (b) in FIG. 2.

Prediction can be divided into intra prediction and inter prediction. Intra prediction uses surrounding coded blocks as a reference to predict a current uncoded block to effectively remove redundancy in a spatial domain. Inter prediction uses adjacent coded images to predict a current image to effectively remove redundancy in a temporal domain.

Transformation refers to transforming an image from the spatial domain to a transform domain, and using transform coefficients to represent the image. Most images contain many flat areas and slowly changing areas. Appropriate transformation can transform an image from a scattered distribution in the spatial domain to a relatively concentrated distribution in the transform domain, remove the frequency domain correlation between signals, and cooperate with the quantization process to effectively compress the bit streams.

Entropy coding is a lossless coding method that can convert a series of element symbols (for example, used to represent a video sequence) into binary bit streams for transmission or storage. The element symbols input to an entropy coding module may include quantized transform coefficients, motion vector information, prediction mode information, syntax related to transform and quantization, etc. Entropy coding can effectively remove the redundancy of video element symbols.

The above is introduced by taking encoding as an example. Video decoding is relative to video encoding, that is, video decoding usually includes processes such as entropy decoding, prediction, inverse quantization, inverse transformation, and filtering. The implementation principle of each process is the same or similar to that of video encoding.

The implementation of the Alternative Temporal Motion Vector Prediction (ATMVP) technology is briefly described below.

The implementation of ATMVP technology mainly includes the following processes:

1) Temporal Motion Vector Prediction (TMVP) is determined: whether motion information of a position A0 of a current block satisfies the following conditions is determined:

a) the position A0 exists and is in the same slice and tile as a current coding unit;

b) a prediction mode of the position A0 is an inter prediction mode;

c) a reference picture index of the position A0 is the same as a reference picture index of a co-located picture corresponding to a current picture (a direction L0 is determined first, and then a direction L1 is determined).

The position A0 is a position corresponding to (xCb−1, yCb+CbHeight−1); (xCb, yCb) are coordinates of an upper left corner of the current block, and CbHeight is a height of the current block.

Figure 3:
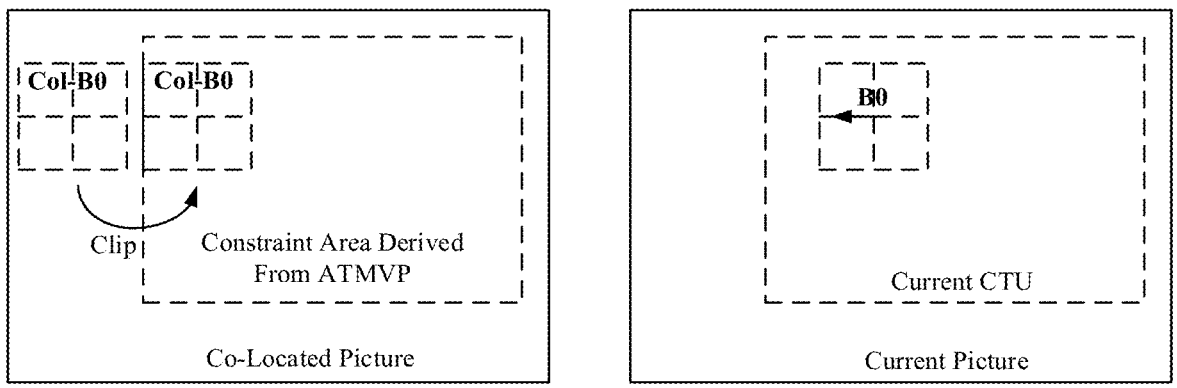
FIG. 3 is a schematic diagram illustrating a clipping operation according to an exemplary embodiment of the present disclosure.

2) A position of a central reference block is calculated: the precision of the TMVP obtained in step 1) is $\frac{1}{16}$, and the motion vector at the position A0 needs to be shifted to the right by 4 bits to adjust the motion vector to an integer-pixel level. At the same time, the position of the central reference block needs to be clipped into the range of the current CTU, that is, when the position of the central reference block is not within the range of the current CTU, the central reference block is horizontally translated or/and vertically translated to just within the range of the current CTU, the schematic diagram of which is shown in FIG. 3. In the present disclosure, the current CTU may refer to a CTU in a reference picture. The current CTU and the matching block are located in the same picture, and the current CTU may be the largest coding unit located in the same position as the largest coding unit in which the current block is located in the reference picture.

The position of the central reference block is calculated as follows:

$$xColCb=Clip3(xCtb,Min(PicWidth-1,xCtb+(1<<CtbLog2Size)+3),xColCtrCb+(tempMv[0]>>4))$$

$$yColCb=Clip3(yCtb,Min(PicHeight-1,yCtb+(1<<CtbLog2Size)-1),yColCtrCb+(tempMv[1]>>4))$$

where (xColCb, yColCb) are coordinates of an upper left corner of the central reference block, (xCtb, yCtb) are coordinates of an upper left corner of the current CTU, PicWidth and PicHeight are a width and a height of the current picture, respectively, CtbLog2Size is a logarithm of the size of the current CTU by using 2 as a base, (xColCtrCb, yColCtrCb) are coordinates of the central position of the current block, and tempMv[0] and tempMv[1] are a horizontal motion vector and a vertical motion vector of the position A0, respectively.

3) A prediction mode of the central reference block is determined. If the prediction mode is a non-inter prediction mode, both ctrPredFlagL0 and ctrPredFlagL1 are 0; otherwise, the prediction mode is an inter prediction mode, and turn to step 4).

4) A reference position is adjusted: since the size of a sub-block is 8*8, the motion information is in a unit of 8*8. Therefore, the coordinates of the upper left corner of the central reference block need to be adjusted to a position corresponding to 8 times the coordinates. The adjustment formula is as follows:

$$xColCb=((xColCb>>3)<<3)$$

$$yColCb=((yColCb>>3)<<3)$$

5) motion information of the adjusted central reference block is obtained: if the prediction mode of the adjusted central reference block is the intra prediction mode or Intra Block Copy (IBC) mode, FlagLXCol=0; otherwise, whether motion information of the directions L0 and L1 of the adjusted central reference block exists is respectively determined, if so, FlagLXCol=1, and motion information of the direction L0 and/or direction L1 of the adjusted central reference block is obtained.

In an example, LX=L0 or LX=L1, when the prediction mode of the adjusted central reference block is the intra prediction mode or intra block copy mode, FlagL0Col=0, and FlagL1Col=0.

When the prediction mode of the adjusted central reference block is neither the intra prediction mode nor the intra block copy mode, FlagL0Col=1 when the motion information of the direction L0 of the adjusted central reference block exists, and FlagL0Col=0 when the motion information of the direction L0 of the adjusted central reference block does not exist; FlagL1Col=1 when the motion information of the direction L1 of the adjusted central reference block exists, FlagL1Col=0 when the motion information of the direction L1 of the adjusted central reference block does not exist.

When FlagLXCol=1, if the long-term reference picture of the current picture and the long-term reference picture of the co-located picture are not the same picture, it is determined that the motion information of the adjusted central reference block is unavailable, and ctrPredFlagLX=0; otherwise, the motion information of the adjusted central reference block is scaled to the first picture in reference picture ListX (X=0 or 1), and the scaled motion information is taken as motion information of the current central reference block, ctrPredFlagLX=1. In the present disclosure, reference picture ListX may be used to indicate reference image queue X (that is, the reference image queue X may be referred to as reference picture ListX for short), for example, reference picture List0 may indicate reference image queue 0, and reference picture List1 may indicate reference image queue 1. Herein, reference picture List0 may refer to a reference picture list used for inter prediction of a P slice or a first reference picture list of two reference picture lists used for inter prediction of a B slice; reference picture List1 may refer to a second reference picture list of two reference picture lists used for inter prediction of a B slice.

6) When ctrPredFlagLX=1, the motion information of each sub-block is calculated: each sub-block in the matching block is traversed, and for any sub-block, the sub-block is clipped into the range of the current CTU. If the motion information of the clipped sub-block is available, the motion information of the clipped sub-block is scaled to the first picture in reference picture ListX, and the scaled motion information is assigned to a sub-block at a corresponding position in the current block; if the motion information of the clipped sub-block is unavailable, the motion information at the central position of the adjusted central reference block is scaled to the first picture in reference picture ListX, and the scaled motion information is assigned to sub-blocks at the corresponding positions in the current block.

In order to make the above objects, features, and advantages of the embodiments of the present disclosure more obvious and understandable, the technical solutions in the embodiments of the present disclosure will be described in detail below with reference to the accompanying drawings.

Figure 4A:
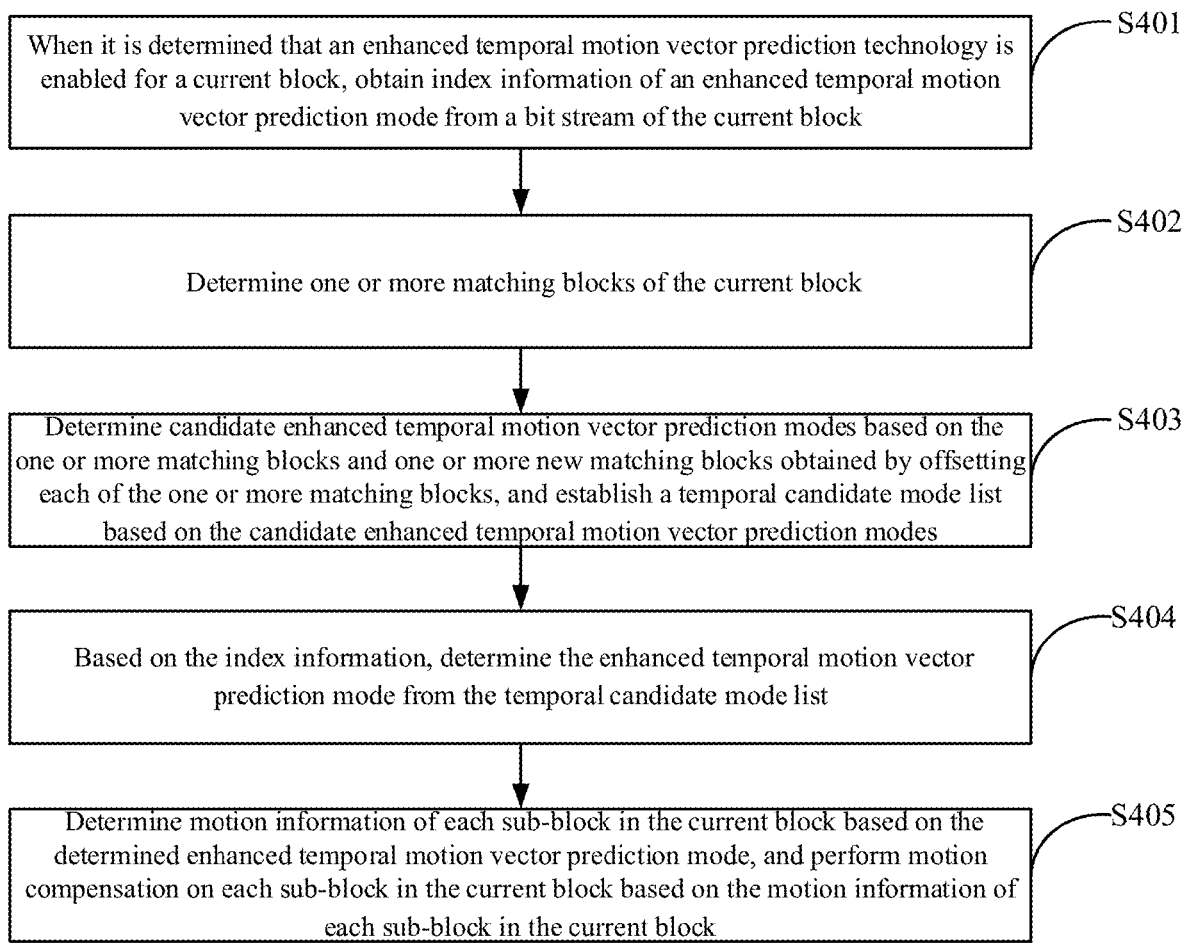
FIG. 4A is a flowchart illustrating a decoding method according to an exemplary embodiment of the present disclosure.

Please refer to FIG. 4A, which is a flowchart illustrating a decoding method according to an embodiment of the present disclosure. The decoding method can be applied to a decoding device. As shown in FIG. 4A, the decoding method can include steps S401 to S405.

Step S401: when it is determined that an enhanced temporal motion vector prediction technology is enabled for a current block, index information of an enhanced temporal motion vector prediction mode is obtained from a bit stream of the current block.

Step S402: one or more matching blocks of the current block are determined.

Step S403: candidate enhanced temporal motion vector prediction modes are determined based on the one or more matching blocks and one or more new matching blocks obtained by offsetting each of the one or more matching blocks, and a temporal candidate mode list is established based on the candidate enhanced temporal motion vector prediction modes.

Step S404: based on the index information, the enhanced temporal motion vector prediction mode is determined from the temporal candidate mode list.

Step S405: motion information of each sub-block in the current block is determined based on the determined enhanced temporal motion vector prediction mode, and motion compensation is performed on each sub-block in the current block based on the motion information of each sub-block in the current block. Where, determining the motion information of each sub-block in the current block based on the determined enhanced temporal motion vector prediction mode includes: for any sub-block in a target matching block, if both forward motion information and backward motion information of the sub-block are available, scaling the forward motion information and the backward motion information of the sub-block to the first picture in reference picture List0 and the first picture in reference picture List1 respectively, and assigning the scaled forward motion information and the scaled backward motion information to a sub-block at a corresponding position in the current block; or if forward motion information of the sub-block is available but backward motion information of the sub-block is unavailable, scaling the forward motion information of the sub-block to the first picture in reference picture List0, and assigning the scaled forward motion information to a sub-block at a corresponding position in the current block; or if backward motion information of the sub-block is available but forward motion information of the sub-block is unavailable, scaling the backward motion information of the sub-block to the first picture in reference picture List1, and assigning the scaled backward motion information to a sub-block at a corresponding position in the current block. A sequence parameter set level syntax may be used to indicate whether the enhanced temporal motion vector prediction technology is enabled for the current block.

In an embodiment of the present disclosure, determining the one or more matching blocks of the current block includes: determining the one or more matching blocks of the current block at least based on a target reference picture index, a target reference direction and a position of the current block, where the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1.

In the embodiments of the present disclosure, one or more matching blocks corresponding to the current block may be determined from a first picture in reference picture List0 or a first picture in reference picture List0, one or more new matching blocks may be obtained by offsetting each of the one or more matching blocks, candidate enhanced temporal motion vector prediction modes may be determined based on the one or more matching blocks and the new matching blocks, the temporal candidate mode list may be established based on the determined candidate enhanced temporal motion vector prediction modes, based on the index information of the enhanced temporal motion vector prediction mode, the enhanced temporal motion vector prediction mode adopted by the current block may be determined from the temporal candidate mode list, and motion compensation may be performed on each sub-block in the current block based on the determined enhanced temporal motion vector prediction mode.

Figure 4B:
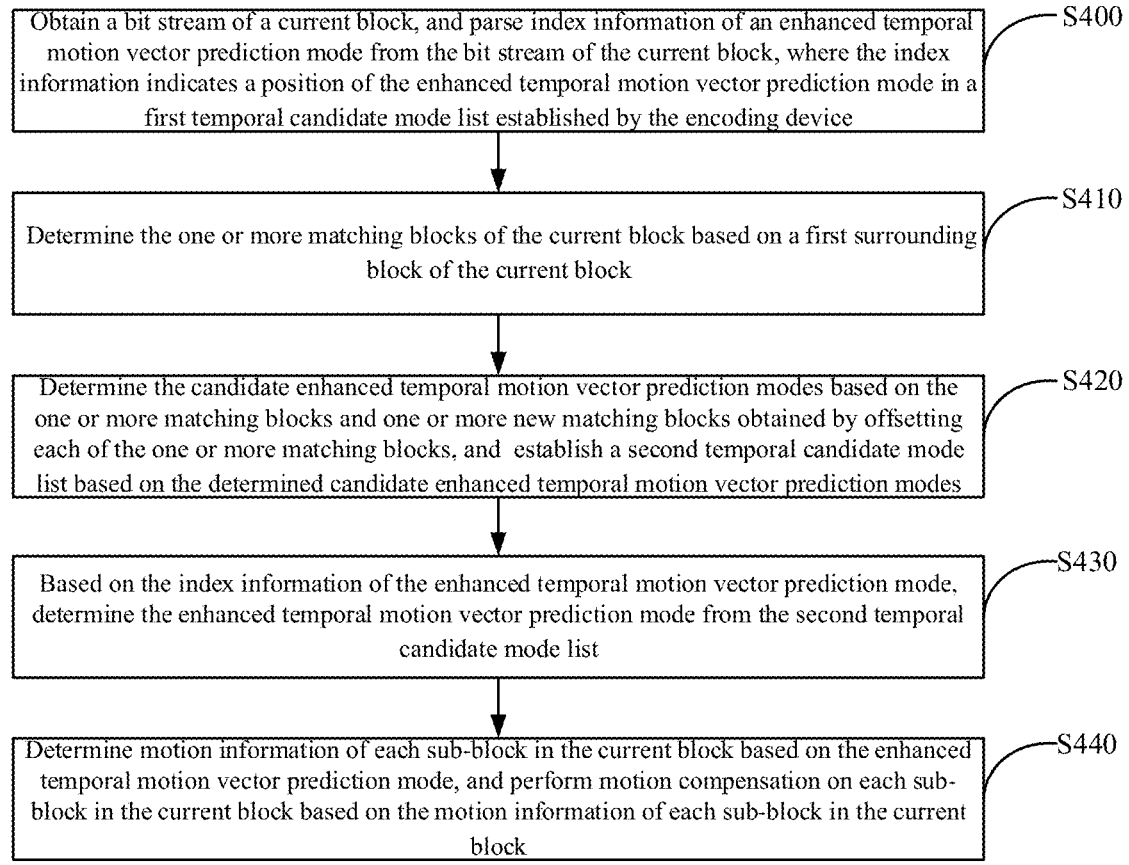
FIG. 4B is a flowchart illustrating another decoding method according to an exemplary embodiment of the present disclosure.

Please refer to FIG. 4B, which is a flowchart illustrating another decoding method according to an embodiment of the present disclosure. The decoding method can be applied to a decoding device. As shown in FIG. 4B, the decoding method can include steps S400 to S440.

Step S400: a bit stream of a current block is obtained, and index information of an enhanced temporal motion vector prediction mode is obtained from the bit stream of the current block, where the index information indicates a position of the enhanced temporal motion vector prediction mode in a first temporal candidate mode list established by the encoding device.

In an embodiment of the present disclosure, the current block may be any image block in an image to be processed. In implementation, the image to be processed may be partitioned into a plurality of image blocks, and then each image block may be processed in a certain order. The size and shape of each image block can be set according to preset partition rules.

For the decoding device, the current block is the block to be decoded.

The bit stream is sent by the encoding side. The bit stream can be a binary bit stream. The bit stream can carry some information that the decoding device needs to know for decoding. For example, the bit stream can carry information about the encoding method adopted by the encoding device, the size of the current block, etc.

To improve the reliability of the motion information of the matching block, the number of matching blocks determined based on a surrounding block of the current block is no longer limited to one, but can be multiple. The encoding device can establish a temporal candidate mode list (can be referred to as the first temporal candidate mode list in the present disclosure) based on temporal prediction modes (can be referred to as candidate enhanced temporal motion vector prediction modes in the present disclosure) corresponding to the multiple matching blocks, and encode index information of a candidate enhanced temporal motion vector prediction mode (can be referred to as the enhanced temporal motion vector prediction mode in the present disclosure) corresponding to the finally used matching block into the bit stream of the current block. The index information is used to indicate the position of the enhanced temporal motion vector prediction mode in the first temporal candidate mode list established by the encoding device.

When obtaining the bit stream of the current block, the decoding device can obtain the index information of the enhanced temporal motion vector prediction mode from the bit stream of the current block.

Step S410: the one or more matching blocks of the current block are determined based on a first surrounding block of the current block.

In an embodiment of the present disclosure, the first surrounding block of the current block may include any decoded adjacent block or non-adjacent block of the current block.

Figure 5:
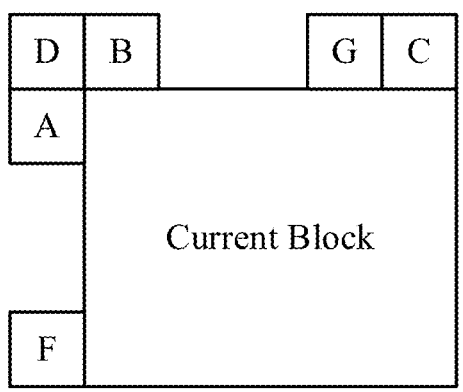
FIG. 5 is a schematic diagram illustrating surrounding blocks of a current block according to an exemplary embodiment of the present disclosure.

For example, referring to FIG. 5, the first surrounding block of the current block may be any one of A, B, C, D, F and G.

The decoding device may determine the one or more matching blocks of the current block based on the first surrounding block of the current block.

Figure 6:
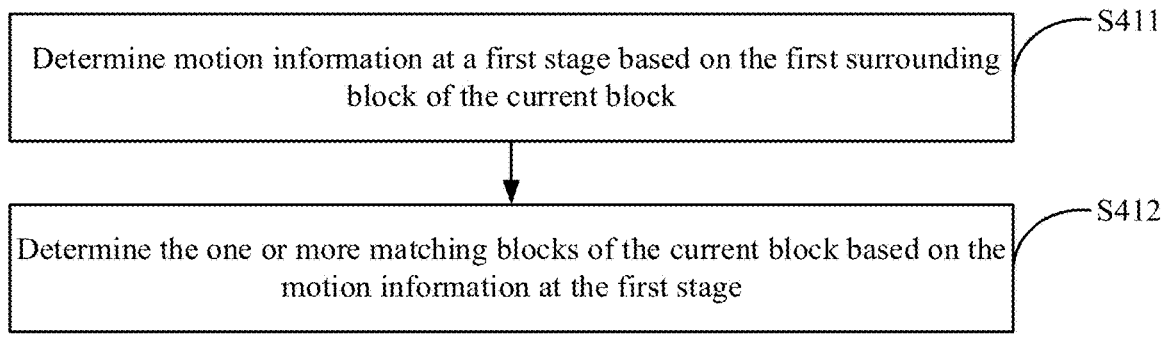
FIG. 6 is a flowchart illustrating determining one or more matching blocks of a current block based on a first surrounding block of the current block according to an exemplary embodiment of the present disclosure.

In an example, as shown in FIG. 6, the one or more matching blocks of the current block are determined based on the first surrounding block of the current block in step S410 can be realized steps S411 and S412.

Step S411: motion information at a first stage is determined based on the first surrounding block of the current block.

Step S412: the one or more matching blocks of the current block are determined based on the motion information at the first stage.

In an example, the first stage may refer to the process of determining the one or more matching blocks of the current block based on a surrounding block of the current block, and the motion information at the first stage may refer to the motion information determined based on a current first surrounding block and used to determine the one or more matching blocks of the current block.

In an example, reference picture List0 and reference picture List1 are both used to record information of the reference picture in the bidirectional prediction mode, for example, identification information of the reference picture such as picture numbers. Based on an index of a picture in reference picture List0 or reference picture List1, the information of reference picture can be determined, for example, the picture number of the reference picture can be determined, and further, the corresponding reference picture can be obtained based on the picture number.

In an embodiment of the present disclosure, determining the motion information at the first stage based on the first surrounding block of the current block may include:

determining that a motion vector at the first stage is 0, a reference picture index is an index of a first picture in reference picture List0, and a reference direction of the motion information at the first stage is a reference direction corresponding to reference picture List0; or, determining that a motion vector at the first stage is 0, a reference picture index is an index of a first picture in reference picture List1, and a reference direction of the motion information at the first stage is a reference direction corresponding to reference picture List1.

In an embodiment of the present disclosure, reference picture List0 and reference picture List1 are both used to record information of the reference picture in the bidirectional prediction mode, for example, identification information of the reference picture such as picture numbers. Based on an index of a picture in reference picture List0 or reference picture List1, the information of reference picture can be determined, for example, the picture number of the reference picture can be determined, and further, the corresponding reference picture can be obtained based on the picture number.

In an example, determining the one or more matching blocks of the current block based on the motion information at the first stage in step S412 may include:

based on a position of the current block, and a horizontal motion vector and a vertical motion vector at the first stage, determining the one or more matching blocks of the current block. This determining step can also be performed in conjunction with the precision of the motion vector.

In an example, when the motion information at the first stage is determined, the decoding device can determine the one or more matching blocks of the current block based on the horizontal motion vector (that is, a horizontal component of the motion vector at the first stage) and the vertical motion vector (that is, a vertical component of the motion vector at the first stage) at the first stage as well as the position of the current block, that is, the position corresponding to the motion information at the first stage is adjusted.

In an example, the precision of the motion vector may include, but is not limited to, 4, 2, 1, ½, ¼, ⅛ or ¹⁄₁₆.

In an example, the position of the current block can be represented by the coordinates of the upper left corner of the current block.

Based on the precision of the motion vector, the decoding device can respectively shift the horizontal motion vector and the vertical motion vector at the first stage to the left (precision greater than 1) or to the right (precision less than 1) by several bits, so as to adjust the horizontal motion vector and the vertical motion vector to an integer-pixel level. Based on the position of the current block, and the adjusted horizontal motion vector and the vertical motion vector at the first stage, a reference position is determined. The reference position is adjusted based on a preset value (which can be set according to an actual scenario, such as 3). Further, the position of the matching block is determined based on the adjusted reference position. The specific implementation can refer to the following specific embodiments.

In another example, determining the one or more matching blocks of the current block based on the motion information at the first stage in step S412 may include:

based on a position of the current block, a horizontal motion vector and a vertical motion vector at the first stage, and a size of a sub-block, determining the one or more matching blocks of the current block.

In an example, when the motion information at the first stage is determined, the decoding device can determine the one or more matching blocks of the current block based on the horizontal motion vector (that is, a horizontal component of the motion vector at the first stage) and the vertical motion vector (that is, a vertical component of the motion vector at the first stage) at the first stage as well as the position of the current block, that is, the position corresponding to the motion information at the first stage is adjusted.

In an example, the precision of the motion vector may include, but is not limited to, 4, 2, 1, ½, ¼, ⅛ or ¹⁄₁₆.

The position of the current block can be represented by the coordinates of the upper left corner of the current block.

Based on the precision of the motion vector, the decoding device can respectively shift the horizontal motion vector and vertical motion vector at the first stage to the left (precision greater than 1) or to the right (precision less than 1) by several bits, and adjust the horizontal motion vector and the vertical motion vector to an integer-pixel level. Based on the position of the current block, and the adjusted horizontal motion vector and the adjusted vertical motion vector at the first stage, a reference position is determined. The reference position is adjusted based on the size of the sub-block (which can be referred to as alignment adjustment). Further, the position of the matching block is determined based on the adjusted reference position.

In an example, assuming that the size of the sub-block is 2N*2N, the reference position may be shifted to the right by N bits first, and then shifted to the left by N bits, where N is a positive integer.

In an example, considering that when alignment adjustment is performed on the reference position based on the side length of the sub-block, remainders obtained by dividing horizontal and vertical coordinates of the reference position by the side length of the sub-block are usually be directly discarded, however, when the remainders obtained by dividing the horizontal and vertical coordinates of the reference position by the side length of the sub-block are greater than half of the side length, the effect of further processing the remainders is better than the effect of directly discarding the remainders, and thus the determined matching block is usually better.

In an example, after the motion information at the first stage is determined, the horizontal motion vector and the vertical motion vector at the first stage may be adjusted based preset adjustment values, respectively, and based on the adjusted horizontal motion vector and the adjusted vertical motion vector at the first stage, the precision of the motion vector, and the position of the current block, the one or more matching blocks of the current block are determined.

In another example, horizontal and vertical coordinates of an upper left corner of the matching block may be preliminarily determined based on the horizontal motion vector and vertical motion vector at the first stage, and the precision of the motion vector, and the preliminarily determined horizontal and vertical coordinates of the upper left corner of the matching block are adjusted based on preset adjustment values, respectively. Finally, alignment adjustment is performed on adjusted horizontal and vertical coordinates based on the side length of the sub-block. The specific implementation can refer to the following specific embodiments.

For example, after the horizontal motion vector and the vertical motion vector at the first stage are adjusted to an integer-pixel level based on the precision of the motion vector, $2^{N-1}$ can be added to the adjusted horizontal motion vector and the adjusted vertical motion vector at the first stage, respectively, or $2^{N-1}$ can be added to the horizontal and vertical coordinates of the upper left corner of the matching block that are preliminarily determined according to the above method, respectively, where $2^N$ is the side length of the sub-block.

In an example, the adjustment value for adjusting the horizontal motion vector at the first stage and the adjustment value for adjusting the vertical motion vector at the first stage may be the same or different;

or, the adjustment value for adjusting the preliminarily determined horizontal coordinate of the upper left corner of the matching block and the adjustment value for adjusting the preliminarily determined vertical coordinate of the upper left corner of the matching block may be the same or different.

Step S420: the candidate enhanced temporal motion vector prediction modes are determined based on the one or more matching blocks and one or more new matching blocks obtained by offsetting each of the one or more matching blocks, and a second temporal candidate mode list is established based on the determined candidate enhanced temporal motion vector prediction modes.

In an embodiment of the present disclosure, when the one or more matching blocks in step S410 are determined, one or more new matching blocks may be obtained by offsetting each of the one or more matching blocks.

In an example, the number of the new matching block obtained by offsetting a matching block may be one or more.

The decoding device may, based on the one or more matching blocks determined in step S410 and the one or more new matching blocks obtained in step S420, determine the temporal prediction modes corresponding to the one or more matching blocks and temporal prediction modes corresponding to the one or more new matching blocks obtained by offsetting as the candidate enhanced temporal motion vector prediction modes, and establish the temporal candidate mode list (referred to as the second temporal candidate mode list in the present disclosure) based on the determined candidate enhanced temporal motion vector prediction modes.

In an example, the number of the candidate enhanced temporal motion vector prediction modes, and the order in which each candidate enhanced temporal motion vector prediction mode is added to the temporal candidate mode list may not be limited, but the decoding device and the encoding device needs to be consistent.

It should be noted that, in a specific implementation scenario, motion information of one or more new matching blocks obtained by offsetting a matching block may be the same or similar to the motion information of the matching block. In this case, a prediction mode corresponding to the one or more new matching blocks may not be taken as a candidate enhanced temporal motion vector prediction mode.

In an example, obtaining one or more new matching blocks by offsetting a matching block can be implemented in the following manner:

a first sub-block and a second sub-block are clipped into the range of the current CTU, and motion information of the clipped first sub-block and motion information of the clipped second sub-block are compared; a third sub-block and a fourth sub-block are clipped into the range of the current CTU, and motion information of the clipped third sub-block and motion information of the clipped fourth sub-block are compared, so as to obtain two comparing results. If at least one of the two comparing results indicates different in motion information, the matching block is horizontally offset rightward by one unit to obtain a new matching block; or a fifth sub-block and a sixth sub-block are clipped into the range of the current CTU, and motion information of the clipped fifth sub-block and motion information of the clipped sixth sub-block are compared; a seventh sub-block and an eighth sub-block are clipped into the range of the current CTU, and motion information of the clipped seventh sub-block and motion information of the clipped eighth sub-block are compared. If at least one of the two comparing results indicates different in motion information, the matching block is horizontally offset leftward by one unit to obtain a new matching block; or a first sub-block and a ninth sub-block are clipped into the range of the current CTU, and motion information of the clipped first sub-block and motion information of the clipped ninth sub-block are compared; a fifth sub-block and a tenth sub-block are clipped into the range of the current CTU, and motion information of the clipped fifth sub-block and motion information of the clipped tenth sub-block are compared, so as to obtain two comparing results. If at least one of the two comparing results indicates different in motion information, the matching block is vertically offset downward by one unit to obtain a new matching block; or a third sub-block and a eleventh sub-block are clipped into the range of the current CTU, and motion information of the clipped third sub-block and motion information of the clipped eleventh sub-block are compared; a seventh sub-block and a twelfth sub-block are clipped into the range of the current CTU, and motion information of the clipped seventh sub-block and motion information of the clipped twelfth sub-block are compared, so as to obtain two comparing results. If at least one of the two comparing results indicates different in motion information, the matching block is vertically offset upward by one unit to obtain a new matching block.

In an example, the first sub-block is a sub-block in an up-left side of the matching block, the second sub-block is a first sub-block in a right side of the matching block, the third sub-block is a sub-block in a down-left side of the matching block, the fourth sub-block is a last sub-block in a right side of the matching block, the fifth sub-block is a sub-block in an up-right side of the matching block, the sixth sub-block is a first sub-block in a left side of the matching block, the seventh sub-block is a sub-block in a down-right side of the matching block, the eighth sub-block is a last sub-block in a left side of the matching block, the ninth sub-block is a first sub-block in a down side of the matching block, the tenth sub-block is a last sub-block in a down side of the matching block, the eleventh sub-block is a first sub-block in an up side of the matching block, and the twelfth sub-block is a last sub-block in an up side of the matching block.

In an example, one unit is the size of the sub-block.

For example, for an 8*8 sub-block, one unit is 8 pixels; for a 4*4 sub-block, one unit is 4 pixels; for a 16*16 sub-block, one unit is 16 pixels.

It should be noted that, when the matching block is offset, it is not limited to offsetting one unit described in the above embodiment, and can also be other values. For example, when the sub-block is an 8*8 sub-block, the matching block may also be offset by other values other than 8 pixels, and the specific implementation thereof will not be repeated here.

Figure 7:
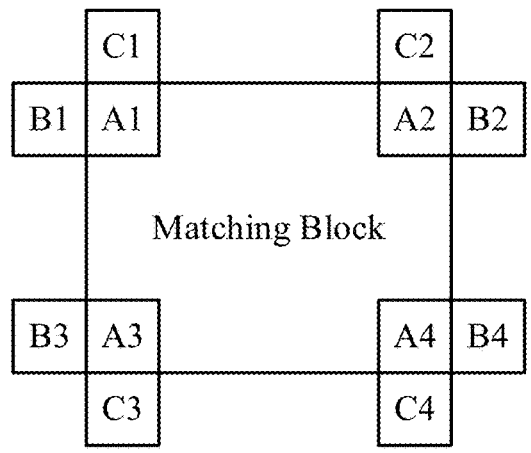
FIG. 7 is a schematic diagram illustrating reference blocks when offsetting a matching block according to an exemplary embodiment of the present disclosure.

Taking FIG. 7 as an example, the first sub-block is A1, the second sub-block is B2, the third sub-block is A3, the fourth sub-block is B4, the fifth sub-block is A2, the sixth sub-block is B1, the seventh sub-block is A4, the eighth sub-block is B3, the ninth sub-block is C3, the tenth sub-block is C4, the eleventh sub-block is C1, and the twelfth sub-block is C2.

Taking A1, B2, A3 and B4 as examples, the decoding device can respectively clip A1, B2, A3 and B4 into the range of the current CTU (that is, the CTU to which the current block belongs), and motion information of the clipped A1 and motion information of the clipped B2 are compared, motion information of the clipped A3 and motion information of the clipped B4 are compared. Considering that if the motion information of the clipped A1 and the motion information of the clipped B2 are the same, and the motion information of the clipped A3 and the motion information of the clipped B4 are the same, motion information of other sub-blocks between the clipped A1 and the clipped B2 will most likely be the same, and motion information of other sub-blocks between the clipped A3 and the clipped B4 will also likely be the same. If the matching block is horizontally offset rightward by one unit, motion information of the obtained new matching block will be likely to be the same as that of the original matching block, and new motion information may not be obtained by this offset.

If the motion information of the clipped A1 and the motion information of the clipped B2 are different, and/or the motion information of the clipped A3 and the motion information of the clipped B4 are different, a new matching block can be obtained by horizontally offsetting the matching block rightward by one unit, and then new motion information can be obtained.

Similarly, according to the above logic, it can be determined whether a corresponding new matching block can be obtained by horizontally offsetting the matching block leftward by one unit, vertically offsetting the matching block upward by one unit, or vertically offsetting the matching block downward by one unit.

It should be noted that, in the embodiment, when no new matching block is obtained in the above manner, the original matching block can be determined as the final candidate matching block, or the current matching block can be offset again according to other offset strategies to obtain a new matching block.

As another example, the one or more new matching blocks obtained by offsetting each of the one or more matching blocks can be determined in the following manner:

for a respective matching block of the one or more matching blocks, based on one or more offset pairs, the respective matching block is horizontally and vertically offset to obtain one or more new matching blocks.

In an example, the decoding device may also obtain a new matching block by horizontally and vertically offsetting the matching block by a preset offset, respectively.

In an example, an offset for horizontally offsetting the matching block and an offset for vertically offsetting the matching block constitute an offset pair.

The decoding device may perform horizontal and vertical offsets on the matching block based on the one or more offset pairs, respectively, to obtain the one or more new matching blocks.

In an example, after determining the one or more matching blocks of the current block in step S410, the decoding method can further include:

the determined one or more matching blocks are clipped into the range of the current CTU.

In an example, to improve the efficiency of determining motion information of each sub-block in the current block in the subsequent process, when the one or more matching blocks in step S410 are determined, the one or more determined matching blocks can be clipped into the range of the current CTU to ensure that each sub-block in the matching block is within the range of the current CTU.

In an example, one or more new matching blocks obtained by offsetting each of the one or more matching blocks can be determined by:

for a respective clipped matching block of the one or more clipped matching blocks, when a right boundary of the clipped matching block is not in a position of a right boundary of the current CTU, the motion information of a thirteenth sub-block and the motion information of a fourteenth sub-block are compared, and the motion information of a fifteenth sub-block and the motion information of a sixteenth sub-block are compared, to obtain two comparing results, if at least one of the two comparing results indicates different in motion information, the clipped matching block is horizontally offset rightward to obtain a new matching block; or when a left boundary of the clipped matching block is not in a position of a left boundary of the current CTU, the motion information of a seventeenth sub-block and the motion information of an eighteenth sub-block are compared, and the motion information of a nineteenth sub-block and the motion information of a twentieth sub-block are compared, to obtain two comparing results, if at least one of the two comparing results indicates different in motion information, the clipped matching block is horizontally offset leftward to obtain a new matching block; or when a lower boundary of the clipped matching block is not in a position of a lower boundary of the current CTU, the motion information of a thirteenth sub-block and the motion information of a twenty-first sub-block are compared, and the motion information of a seventeenth sub-block and the motion information of a twenty-second sub-block are compared, to obtain two comparing results, if at least one of the two comparing results indicates different in motion information, the clipped matching block is vertically offset downward to obtain a new matching block; or when an upper boundary of the clipped matching block is not in a position of an upper boundary of the current CTU, the motion information of a fifteenth sub-block and the motion information of a twenty-third sub-block are compared, and the motion information of a nineteenth sub-block and the motion information of a twenty-fourth sub-block are compared, to obtain two comparing results, if at least one of the two comparing results indicates different in motion information, the clipped matching block is vertically offset upward to obtain a new matching block.

In an example, the thirteenth sub-block is a sub-block in an up-left side of the clipped matching block, the fourteenth sub-block is a first sub-block in a right side of the clipped matching block, the fifteenth sub-block is a sub-block in a down-left side of the clipped matching block, the sixteenth sub-block is a last sub-block in a right side of the clipped matching block, the seventeenth sub-block is a sub-block in an up-right side of the clipped matching block, the eighteenth sub-block is a first sub-block in a left side of the clipped matching block, the nineteenth sub-block is a sub-block in a down-right side of the clipped matching block, the twentieth sub-block is a last sub-block in a left side of the clipped matching block, the twenty-first sub-block is a first sub-block in a down side of the clipped matching block, the twenty-second sub-block is a last sub-block in a down side of the clipped matching block, the twenty-third sub-block is a first sub-block in an up side of the clipped matching block, and the twenty-fourth sub-block is a last sub-block in an up side of the clipped matching block.

In an example, one unit is the side length of the sub-block, for example, the size of the sub-block is 8*8, and the side length of the sub-block is 8 pixels.

Still taking FIG. 7 as an example, assuming that the matching block in FIG. 7 is the clipped matching block, the thirteenth sub-block is A1, the fourteenth sub-block is B2, the fifteenth sub-block is A3, the sixteenth sub-block is B4, the seventeenth sub-block is A2, the eighteenth sub-block is B1, the nineteenth sub-block is A4, the twentieth sub-block is B3, the twenty-first sub-block is C3, and the twenty-second sub-block is C4, the twenty-third sub-block is C1, and the twenty-fourth sub-block is C2.

To ensure that each sub-block in the matching block is within the range of the current CTU to improve the efficiency of determining the motion information of each sub-block in the current block, when the one or more matching blocks in step S410 are determined, a clipping operation can be performed on each of the one or more matching blocks, so that the clipped matching block is within the range of the current CTU.

Considering that coordinates of vertices of the matching block are all aligned according to integer multiples of the side length of the sub-block, that is, the coordinates of the vertices of the matching block are all integer multiple of the side length of the sub-block, therefore, distances between boundaries of the clipped matching block and positions of respective boundaries of the current CTU are all integer multiples of the side length of the sub-block.

In order to ensure that each sub-block in the matching block obtained by offsetting is within the range of the current CTU, when offsetting the clipped matching block, it is necessary to ensure that in the offset direction, a distance between a boundary of the clipped matching block and a position of a corresponding boundary of the current CTU is greater than 0, that is, in the offset direction, a boundary of the clipped matching block is not located at a position of a corresponding boundary of the current CTU.

In an example, when the right boundary of the clipped matching block is not located at the position of the right boundary of the current CTU, the decoding device may determine whether it is necessary to horizontally offset the clipped matched block rightward based on the comparing result of the motion information of A1 and the motion information of B2, and the comparing result of the motion information of A3 and the motion information of B4. If at least one of the two comparing results indicates different in motion information, the clipped matching block may be horizontally offset rightward by one unit.

Similarly, when the left boundary of the clipped matching block is not located at the position of the left boundary of the current CTU, the decoding device may determine whether it is necessary to horizontally offset the clipped matched block leftward based on the comparing result of the motion information of A2 and the motion information of B1, and the comparing result of the motion information of A4 and the motion information of B3. If at least one of the two comparing results indicates different in motion information, the clipped matching block may be horizontally offset leftward by one unit.

When the lower boundary of the clipped matching block is not located at the position of the lower boundary of the current CTU, the decoding device may determine whether it is necessary to vertically offset the clipped matched block downward based on the comparing result of the motion information of A1 and the motion information of C3, and the comparing result of the motion information of A2 and the motion information of C4. If at least one of the two comparing results indicates different in motion information, the clipped matching block may be vertically offset downward by one unit.

When the upper boundary of the clipped matching block is not located at the position of the upper boundary of the current CTU, the decoding device may determine whether it is necessary to vertically offset the clipped matched block upward based on the comparing result of the motion information of A3 and the motion information of C1, and the comparing result of the motion information of A4 and the motion information of C2. If at least one of the two comparing results indicates different in motion information, the clipped matching block may be vertically offset upward by one unit. In an example, the candidate enhanced temporal motion vector prediction modes are determined based on the one or more matching blocks and the one or more new matching blocks obtained by offsetting each of the one or more matching blocks in step S420, which may include:

when there are one or more new matching blocks, prediction modes corresponding to the one or more matching blocks before the offsetting and prediction modes corresponding to the one or more new matching blocks obtained by the offsetting are determined as the candidate enhanced temporal motion vector prediction modes.

In an example, when a clipping operation is performed on the matching block before offsetting the matching block, the matching block before the offsetting may be the clipped matching block; when a clipping operation is not performed on the matching block before offsetting the matching block, the matching block before the offsetting is the original matching block.

In an example, when the decoding device obtains one or more new matching blocks according to the manner described in the above embodiment, the decoding device may determine prediction modes corresponding to the one or more matching block before the offsetting and prediction modes corresponding to the one or more new matching blocks obtained by the offsetting as the candidate enhanced temporal motion vector prediction modes.

It should be noted that, when there are a plurality of new matching blocks, the decoding device can determine some or all of prediction modes corresponding to the plurality of new matching blocks as the candidate enhanced temporal motion vector prediction modes.

When the decoding device does not obtain a new matching block according to the manner described in the above, the decoding device can determine the prediction mode corresponding to the matching block before the offsetting as a candidate enhanced temporal motion vector prediction mode.

In an example, the second temporal candidate mode list includes at least one candidate enhanced temporal motion vector prediction mode, and each candidate enhanced temporal motion vector prediction mode corresponds to a different matching block.

Step S430: based on the index information of the enhanced temporal motion vector prediction mode, the enhanced temporal motion vector prediction mode is determined from the second temporal candidate mode list.

In the embodiment of the present disclosure, considering that when the technical solutions provided by the embodiments of the present disclosure are adopted, for the same image block, the orders of each candidate enhanced temporal motion vector prediction mode in the temporal candidate mode lists are the same when the encoding device and the decoding device establish a temporal candidate mode list, therefore, the position of the enhanced temporal motion vector prediction mode in the temporal candidate mode list established by the encoding device is the same as that of the enhanced temporal motion vector prediction mode in the temporal candidate mode list established by the decoding device.

Therefore, the decoding device can, based on the index information of the enhanced temporal motion vector prediction mode obtained from the bit stream of the current block, determine the enhanced temporal motion vector prediction mode from the second temporal candidate mode list established by the decoding device.

Step S440: motion information of each sub-block in the current block is determined based on the enhanced temporal motion vector prediction mode, and motion compensation is performed on each sub-block in the current block based on the motion information of each sub-block in the current block.

In the embodiment of the present disclosure, when the enhanced temporal motion vector prediction mode is determined, the motion information of each sub-block in the current block can be determined based on the matching block corresponding to the enhanced temporal motion vector prediction mode (this matching block may be referred to as a target matching block in the present disclosure), and motion compensation can be performed on each sub-block in the current block based on the motion information of each sub-block in the current block.

In an example, each candidate enhanced temporal motion vector prediction mode in the second temporal candidate mode list corresponds to a different matching block.

In an example, determining the motion information of each sub-block in the current block based on the enhanced temporal motion vector prediction mode in step S440 may include:

for any sub-block in the target matching block, clipping the sub-block into the range of the current CTU;

if both forward motion information and backward motion information of the clipped sub-block are available, scaling the forward motion information and the backward motion information of the clipped sub-block to the first picture in reference picture List0 and the first picture in reference picture List1 respectively, and assigning the scaled forward motion information and the scaled backward motion information to a sub-block at a corresponding position in the current block; or if forward motion information of the clipped sub-block is available but backward motion information of the clipped sub-block is unavailable, scaling the forward motion information of the clipped sub-block to the first picture in reference picture List0, and assigning the scaled forward motion information to a sub-block at a corresponding position in the current block; or if backward motion information of the clipped sub-block is available but forward motion information of the clipped sub-block is unavailable, scaling the backward motion information of the clipped sub-block to the first picture in reference picture List1, and assigning the scaled backward motion information to a sub-block at a corresponding position in the current block.

In an example, in order to improve the accuracy of the determined motion information of each sub-block in the current block, for any sub-block in the target matching block, the decoding device can clip the sub-block into the range of the current CTU and determine whether the forward motion information and the backward motion information of the clipped sub-block after are available.

When both the forward motion information and the backward motion information of the clipped sub-block are available, the decoding device can perform scaling on the forward motion information and the backward motion information of the clipped sub-block, respectively, to scale the forward motion information of the clipped sub-block to the first picture in reference picture List0, and scale the backward motion information of the clipped sub-block to the first picture in reference picture List1. Further, the scaled forward motion information and the scaled backward motion information are assigned to a sub-block at a corresponding position in the current block.

When the forward motion information of the clipped sub-block is available, but the backward motion information of the clipped sub-block is unavailable, the forward motion information of the clipped sub-block is scaled to the first picture in reference picture List0, and the scaled forward motion information is assigned to a sub-block at a corresponding position in the current block.

When the backward motion information of the clipped sub-block is available, but the forward motion information of the clipped sub-block is unavailable, the backward motion information of the clipped sub-block is scaled to the first picture in reference picture List1, and the scaled backward motion information is assigned to a sub-block at a corresponding position in the current block.

It should be noted that, in an embodiment, when the forward motion information of the clipped sub-block is available, but the backward motion information of the clipped sub-block is unavailable, the forward motion information of the clipped sub-block can also be scaled to the first picture in reference picture List0 and the first picture in reference picture List1, respectively, and the scaled motion information is assigned to the sub-blocks corresponding to the current block (the scaled motion information obtained by being scaled to the first picture in reference picture List0 is used as forward motion information, and the scaled motion information obtained by being scaled to the first picture in reference picture List1 is used as backward motion information).

The similar way may be used in the case where the backward motion information of the clipped sub-block is available, but the forward motion information of the clipped sub-block is unavailable.

In an example, for any sub-block in the target matching block, if the sub-block is clipped into the range of the current CTU, when the forward motion information and the backward motion information of the clipped sub-block are both unavailable, motion information of a sub-block at a corresponding position in the current block can be determined at least by the following way:

If the forward motion information and the backward motion information of the clipped sub-block are both unavailable, when both forward motion information and backward motion information of a second surrounding block of the current block are available, the forward motion information and the backward motion information of the second surrounding block are scaled to the first picture in reference picture List0 and the first picture in reference picture List1 respectively, and the scaled forward motion information and the scaled backward motion information are assigned to a sub-block at a corresponding position in the current block; or when the forward motion information of the second surrounding block is available, but the backward motion information of the second surrounding block is unavailable, the forward motion information of the second surrounding block is scaled to the first picture in reference picture List0, and the scaled forward motion information is assigned to a sub-block at a corresponding position in the current block; or when the backward motion information of the second surrounding block is available, but the forward motion information of the second surrounding block is unavailable, the backward motion information of the second surrounding block is scaled to the first picture in reference picture List1, and the scaled backward motion information is assigned to a sub-block at a corresponding position in the current block; or when the forward motion information and the backward motion information of the second surrounding block are both unavailable, zero motion information is assigned to a sub-block at a corresponding position in the current block.

In an example, the first surrounding block of the current block may include any decoded adjacent block or non-adjacent block of the current block.

The second surrounding block and the first surrounding block may be the same or different.

In an example, when the forward motion information and the backward motion information of the clipped sub-block are both unavailable, the decoding device can determine whether the forward motion information and the backward motion information of the second surrounding block of the current block are available, if both the forward motion information and the backward motion information of the second surrounding block are available, the decoding device can scale the forward motion information and the backward motion information of the second surrounding block to the first picture in reference picture List0 and the first picture in reference picture List1, respectively, and assign the scaled forward motion information and the scaled backward motion information to the sub-blocks at the corresponding positions in the current block.

If the forward motion information of the second surrounding block is available, but the backward motion information of the second surrounding block is unavailable, the forward motion information of the second surrounding block is scaled to the first picture in reference picture List0, and the scaled forward motion information is assigned to the sub-blocks at the corresponding positions in the current block.

If the backward motion information of the second surrounding block is available, but the forward motion information of the second surrounding block is unavailable, the backward motion information of the second surrounding block is scaled to the first picture in reference picture List1, and the scaled backward motion information is assigned to the sub-blocks at the corresponding positions in the current block.

If the forward motion information and backward motion information of the second surrounding block are both unavailable, the decoding device may assign the zero motion information to the sub-blocks at the corresponding positions in the current block.

It should be noted that, in an embodiment, when forward motion information at a central position of the clipped target matching block is available, but the backward motion information at a central position of the clipped target matching block is unavailable, the forward motion information of the central position of the clipped target matching block may also be scaled to the first picture in reference picture List0 and the first picture in reference picture List1, respectively, and the scaled motion information is assigned to sub-blocks corresponding to the current block (the scaled motion information obtained by being scaled to the first picture in reference picture List0 is used as forward motion information, and the scaled motion information obtained by being scaled to the first picture in reference picture List1 is used as backward motion information).

The similar way may be used in the case where backward motion information at the central position of the clipped target matching block is available, but forward motion information at the central position of the clipped target matching block is unavailable, and the case where one of the forward motion information and the backward motion information of the second surrounding block is available, but the other is unavailable.

In an example, determining the motion information of each sub-block in the current block based on the enhanced temporal motion vector prediction mode in step S440 may include:

for any sub-block in a target matching block, if both forward motion information and backward motion information of the sub-block are available, scaling the forward motion information and the backward motion information of the sub-block to the first picture in reference picture List0 and the first picture in reference picture List1 respectively, and assigning the scaled forward motion information and the scaled backward motion information to a sub-block at a corresponding position in the current block; or if forward motion information of the sub-block is available but backward motion information of the sub-block is unavailable, scaling the forward motion information of the sub-block to the first picture in reference picture List0, and assigning the scaled forward motion information to a sub-block at a corresponding position in the current block; or if backward motion information of the sub-block is available but forward motion information of the sub-block is unavailable, scaling the backward motion information of the sub-block to the first picture in reference picture List1, and assigning the scaled backward motion information to a sub-block at a corresponding position in the current block.

In an example, in order to improve the efficiency of determining the motion information of each sub-block in the current block, for any sub-block in the target matching block, the decoding device can determine whether the motion information of the sub-block is available.

When both the forward motion information and the backward motion information of the sub-block are available, the decoding device can perform scaling on the forward motion information and the backward motion information of the sub-block, respectively, to scale the forward motion information of the sub-block to the first picture in reference picture List0, and scale the backward motion information of the sub-block to the first picture in reference picture List1. Further, the scaled forward motion information and the scaled backward motion information are assigned to a sub-block at a corresponding position in the current block.

When the forward motion information of the sub-block is available, but the backward motion information is unavailable, the forward motion information of the sub-block is scaled to the first picture in reference picture List0, and the scaled forward motion information is assigned to a sub-block at a corresponding position in the current block.

When the backward motion information of the sub-block is available, but the forward motion information is unavailable, the backward motion information of the sub-block is scaled to the first picture in reference picture List1, and the scaled backward motion information is assigned to a sub-block at a corresponding position in the current block.

It should be noted that, in an embodiment, when the forward motion information of the sub-block is available, but the backward motion information of the sub-block is unavailable, the forward motion information of the sub-block can also be scaled to the first picture in reference picture List0 and the first picture in reference picture List1, respectively, and the scaled motion information is assigned to the sub-blocks corresponding to the current block (the scaled motion information obtained by being scaled to the first picture in reference picture List0 is used as forward motion information, and the scaled motion information obtained by being scaled to the first picture in reference picture List1 is used as backward motion information).

The similar way may be used in the case where the backward motion information of the sub-block is available, but the forward motion information of the sub-block is unavailable.

In an example, for any sub-block in the target matching block, if the forward motion information and the backward motion information of the sub-block are both unavailable, motion information of a sub-block at a corresponding position in the current block can be determined at least by the following way:

If the forward motion information and the backward motion information of the sub-block are both unavailable, when both forward motion information and backward motion information of a second surrounding block of the current block are available, the forward motion information and the backward motion information of the second surrounding block are scaled to the first picture in reference picture List0 and the first picture in reference picture List1 respectively, and the scaled forward motion information and the scaled backward motion information are assigned to a sub-block at a corresponding position in the current block; or when the forward motion information of the second surrounding block is available, but the backward motion information of the second surrounding block is unavailable, the forward motion information of the second surrounding block is scaled to the first picture in reference picture List0, and the scaled forward motion information is assigned to a sub-block at a corresponding position in the current block; or when the backward motion information of the second surrounding block is available, but the forward motion information of the second surrounding block is unavailable, the backward motion information of the second surrounding block is scaled to the first picture in reference picture List1, and the scaled backward motion information is assigned to a sub-block at a corresponding position in the current block; or when the forward motion information and the backward motion information of the second surrounding block are both unavailable, zero motion information is assigned to a sub-block at a corresponding position in the current block.

In an example, when the forward motion information and the backward motion information of the sub-block are both unavailable, the decoding device can determine whether the forward motion information and the backward motion information of the second surrounding block of the current block are available, if both the forward motion information and the backward motion information of the second surrounding block are available, the decoding device can scale the forward motion information and the backward motion information of the second surrounding block to the first picture in reference picture List0 and the first picture in reference picture List1, respectively, and assign the scaled forward motion information and the scaled backward motion information to the sub-blocks at the corresponding positions in the current block.

If the forward motion information of the second surrounding block is available, but the backward motion information of the second surrounding block is unavailable, the forward motion information of the second surrounding block is scaled to the first picture in reference picture List0, and the scaled forward motion information is assigned to the sub-blocks at the corresponding positions in the current block.

If the backward motion information of the second surrounding block is available, but the forward motion information of the second surrounding block is unavailable, the backward motion information of the second surrounding block is scaled to the first picture in reference picture List1, and the scaled backward motion information is assigned to the sub-blocks at the corresponding positions in the current block.

If the forward motion information and backward motion information of the second surrounding block are both unavailable, the decoding device may assign the zero motion information to the sub-blocks at the corresponding positions in the current block.

In an embodiment, the second surrounding block of the current block may be the same as or different from the first surrounding block mentioned above. Referring to FIG. 5, the second surrounding block may be, for example, the last sub-block in a left side of the current block, that is, an F block.

In an example, the index information of the enhanced temporal motion vector prediction mode is obtained from the bit stream of the current block in step S400 or S401 may include:

when it is determined that the enhanced temporal motion vector prediction technology is enabled for the current block, the index information of the enhanced temporal motion vector prediction mode is obtained from the bit stream of the current block.

In an example, in order to enhance the controllability and flexibility of the technology provided by the embodiments of the present disclosure (referred to as the Enhanced Temporal Motion Vector Prediction (ETMVP) technology), and realize the compatibility with the traditional ATMVP technology, the enhanced temporal motion vector prediction technology can be controlled to be enabled according to the actual scenario.

When the decoding device receives the bit stream of the current block, and determines that the enhanced temporal motion vector prediction technology is enabled for the current block, the decoding device can obtain the index information of the enhanced temporal motion vector prediction mode from the bit stream of the current block, and perform subsequent processing in the manners described in the above embodiments.

When the decoding device determines that the enhanced temporal motion vector prediction technology is disabled for the current block, the decoding device may perform processing according to the traditional ATMVP technology.

In an example, a Sequence Parameter Set (SPS) level syntax is used to indicate whether the enhanced temporal motion vector prediction technology is disabled for the current block.

In an example, in order to reduce bit consumption of the control of whether the enhanced temporal motion vector prediction technology is enabled, the SPS level syntax may be used to control whether the enhanced temporal motion vector prediction technology is enabled for the current block.

For an image sequence, an SPS level flag bit may be set, and the SPS level flag bit indicates whether the enhanced temporal motion vector prediction technology is enabled for the image sequence.

For example, the SPS level flag bit can be a flag bit with a length of 1 bit. When the value of the flag bit is a first value (such as 1), it indicates that the enhanced temporal motion vector prediction technology is enabled for the corresponding image sequence. When the value of the flag bit is a second value (such as 0), it indicates that the enhanced temporal motion vector prediction technology is disabled for the corresponding image sequence.

For any block, the decoding device may determine whether the enhanced temporal motion vector prediction technology is enabled for the current block based on whether the enhanced temporal motion vector prediction technology is enabled for an image sequence to which the block belongs.

In an example, when the enhanced temporal motion vector prediction technology is enabled for the image sequence to which the current block belongs, it is determined that the enhanced temporal motion vector prediction technology is enabled for the current block.

When the enhanced temporal motion vector prediction technology is disabled for the image sequence to which the current block belongs, it is determined that the enhanced temporal motion vector prediction technology is disabled for the current block.

In the embodiment of the present disclosure, a bit stream of a current block is obtained, and index information of an enhanced temporal motion vector prediction mode obtained from the bit stream of the current block; one or more matching blocks of the current block are determined; candidate enhanced temporal motion vector prediction modes are determined based on the one or more matching blocks and one or more new matching blocks obtained by offsetting each of the one or more matching blocks, and a second temporal candidate mode list established based on the candidate enhanced temporal motion vector prediction modes; based on the index information of the enhanced temporal motion vector prediction mode, the enhanced temporal motion vector prediction mode is determined from the second temporal candidate mode list; motion information of each sub-block in the current block is determined based on the enhanced temporal motion vector prediction mode, and motion compensation is performed on each sub-block in the current block based on the motion information of each sub-block in the current block. By offsetting each of the one or more matching blocks determined based on a surrounding block of the current block, the one or more new matching blocks are obtained, which reduces the probability of inaccurate motion information of the matching block caused by inaccurate motion information of the surrounding block, and improves the decoding performance.

As an example, the embodiments of the present disclosure also provide an encoding method which can be applied to an encoding device, and the encoding method can include steps A1 to A5.

Step A1: one or more matching blocks of a current block are determined.

For the specific implementation manner, please refer to the above embodiments of the decoding method, and details are not described again in this embodiment of the present disclosure.

Step A2: candidate enhanced temporal motion vector prediction modes are determined based on the one or more matching blocks and one or more new matching blocks obtained by offsetting each of the one or more matching blocks, and a first temporal candidate mode list is established based on the candidate enhanced temporal motion vector prediction modes.

For the specific implementation manner, please refer to step S420 in the embodiment of FIG. 4, and details are not described again in this embodiment of the present disclosure.

Step A3: the candidate enhanced temporal motion vector prediction modes in the first temporal candidate mode list are traversed, and for any of the candidate enhanced temporal motion vector prediction modes, motion information of each sub-block in the current block determined based on the candidate enhanced temporal motion vector prediction mode, and motion compensation is performed on each sub-block in the current block based on the motion information of each sub-block in the current block.

In an example, when the first temporal candidate mode list is established in the manner described in step A2, the encoding device may traverse each candidate enhanced temporal motion vector prediction mode in the first temporal candidate mode list.

For any of the candidate enhanced temporal motion vector prediction modes, the encoding device can determine the motion information of each sub-block in the current block based on the candidate enhanced temporal motion vector prediction mode, and perform motion compensation on each sub-block in the current block based on the motion information of each sub-block in the current block. For the specific implementation manner, please refer to step S440 in the embodiment of FIG. 4, and details are not described again in this embodiment of the present disclosure.

Step A4: based on a rate-distortion cost corresponding to each candidate enhanced temporal motion vector prediction mode in the temporal candidate mode list, a candidate enhanced temporal motion vector prediction mode with a smallest rate-distortion cost is determined as an enhanced temporal motion vector prediction mode of the current block.

In an example, when the encoding device performs motion compensation on each sub-block in the current block based on each candidate enhanced temporal motion vector prediction mode in the manner described in step A3, the encoding device can respectively determine a rate-distortion cost corresponding to each candidate enhanced temporal motion vector prediction mode in the temporal candidate mode list, and determine a candidate enhanced temporal motion vector prediction mode with a smallest rate-distortion cost as the enhanced temporal motion vector prediction mode of the current block.

Step A5: index information is carried in a bit stream of the current block, where the index information is used to indicate a mode index of the determined enhanced temporal motion vector prediction mode.

In an example, when the encoding device determines the enhanced temporal motion vector prediction mode of the current block, the encoding device can carry the index information of the enhanced temporal motion vector prediction mode of the current block in the bit stream of the current block, so that the decoding device can determine the enhanced temporal motion vector prediction mode of the current block based on the index information in the bit stream.

In the embodiment of the present disclosure, one or more matching blocks of a current block are determined; candidate enhanced temporal motion vector prediction modes are determined based on the one or more matching blocks and one or more new matching blocks obtained by offsetting each of the one or more matching blocks, and a first temporal candidate mode list established based on the candidate enhanced temporal motion vector prediction modes; the candidate enhanced temporal motion vector prediction modes in the first temporal candidate mode list are traversed, and for any of the candidate enhanced temporal motion vector prediction modes, motion information of each sub-block in the current block is determined based on the candidate enhanced temporal motion vector prediction mode, and motion compensation is performed on each sub-block in the current block based on the motion information of each sub-block in the current block; based on a rate-distortion cost corresponding to each candidate enhanced temporal motion vector prediction mode in the temporal candidate mode list, a candidate enhanced temporal motion vector prediction mode with a smallest rate-distortion cost is determined as an enhanced temporal motion vector prediction mode of the current block; index information of the enhanced temporal motion vector prediction mode of the current block is carried in a bit stream of the current block. By offsetting each of the one or more matching blocks determined based on a surrounding block of the current block, one or more new matching blocks are obtained, which reduces the probability of inaccurate motion information of the matching block caused by inaccurate motion information of the surrounding block, and improves the encoding performance.

In order to make those skilled in the art better understand the technical solutions according to the embodiments of the present disclosure, the technical solutions according to the embodiments of the present disclosure are described below in conjunction with specific examples.

EXAMPLE 1

An encoding method according to an embodiment of the present disclosure provides can include the following steps:
1. motion information at a first stage is determined by using motion information of a surrounding block (for example, the above-mentioned first surrounding block) of a current block;
2. one or more matching blocks of the current block are determined by using the motion information at the first stage;
3. candidate enhanced temporal motion vector prediction modes are determined based on the one or more matching blocks and one or more new matching blocks obtained by offsetting each of the one or more matching blocks, and a first temporal candidate mode list is established based on the candidate enhanced temporal motion vector prediction modes;
4. each candidate enhanced temporal motion vector prediction mode in the first temporal candidate mode list are traversed in order, and for any of the candidate enhanced temporal motion vector prediction modes, motion information of all sub-blocks in the current block is obtained based on motion information of the matching block;
5. motion compensation is performed on each sub-block in the current block based on the motion information of each sub-block in the current block;
6. a rate-distortion cost corresponding to the candidate enhanced temporal motion vector prediction mode is determined, the rate-distortion cost is compared with rate-distortion costs corresponding to other candidate enhanced temporal motion vector prediction modes, a candidate enhanced temporal motion vector prediction mode with a smallest rate-distortion cost is taken as an enhanced temporal motion vector prediction mode of the current block, and index information of the enhanced temporal motion vector prediction mode is carried in a bit stream and transmitted to a decoding device, where the index information is used to indicate a mode index of the determined enhanced temporal motion vector prediction mode.

EXAMPLE 2 a decoding method according to an embodiment of the present disclosure may include the following steps:
1. a bit stream of a current block is obtained, and index information of an enhanced temporal motion vector prediction mode is obtained from the bit stream of the current block, where the index information is used to indicate a mode index of the determined enhanced temporal motion vector prediction mode;
2. motion information at a first stage is determined by using motion information of a surrounding block (for example, the above-mentioned first surrounding block) of the current block;
3. one or more matching blocks of the current block are determined by using the motion information at the first stage;
4. candidate enhanced temporal motion vector prediction modes are determined based on the one or more matching blocks and one or more new matching blocks obtained by offsetting each of the one or more matching blocks, and a second temporal candidate mode list is established based on the candidate enhanced temporal motion vector prediction modes;
5. according to the index information obtained in step 1, a corresponding enhanced temporal motion vector prediction mode in the second temporal candidate mode list is obtained, and according to motion information of a target matching block corresponding to the enhanced temporal motion vector prediction mode, motion information of all sub-blocks in the current block is obtained;
6. motion compensation is performed on each sub-block in the current block according to the motion information of each sub-block in the current block.

The specific implementation of some steps will be described below.

I. motion information at a first stage is determined by using motion information of a surrounding block of a current block.

In an example, a schematic diagram of the spatially adjacent blocks of a current block may be shown in FIG. 5, taking the surrounding block of the current block being an F block as an example.

EXAMPLE 3

It is determined that a motion vector at the first stage is 0, a reference picture index is an index of a first picture in reference picture List0, and a reference direction of the motion information at the first stage is a reference direction corresponding to reference picture List0.

EXAMPLE 4

It is determined that a motion vector at the first stage is 0, a reference picture index is an index of a first picture in reference picture List1, and a reference direction of the motion information at the first stage is a reference direction corresponding to reference picture List1.

II. one or more matching blocks of the current block are determined by using the motion information at the first stage.

EXAMPLE 5

Assume that a horizontal motion vector at the first stage is MVx, a vertical motion vector at the first stage is MVy, coordinates of an upper left corner of the current block are (Xpos, Ypos), and a precision of a motion vector is Precision.

In an example, a value of Precision may be 4, 2, 1, ½, ¼, ⅛ or 1/16.

When the value of Precision is 1, ½, ¼, ⅛ or 1/16, coordinates of an upper left corner of the matching block corresponding to the current block are:

$$Mx0=((Xpos+(MVx>>shift)+4)>>3)<<3$$

$$My0=((Ypos+(MVy>>shift)+4)>>3)<<3$$

The value of shift corresponds to Precision one-to-one. When the value of Precision is 1, ½, ¼, ⅛ and 1/16, respectively, the value of shift is 0, 1, 2, 3 and 4, respectively.

When the value of Precision is 4 or 2, the coordinates of the upper left corner of the matching block corresponding to the current block are:

$$Mx0=((Xpos+(MVx<<shift)+4)>>3)<<3$$

$$My0=((Ypos+(MVy<<shift)+4)>>3)<<3$$

The value of shift corresponds to Precision one-to-one. When the value of Precision is 4 and 2, respectively, the value of shift is 2 and 1, respectively.

In this example, an adjustment value $2^{N-1}$ (N is a logarithm of the side length of the sub-block by using 2 as a base, an 8*8 sub-block is taken as an example in this example, that is, $2^{N-1}=4$) is used to respectively adjust the horizontal motion vector (MVx>>shift) and the vertical motion vector (MVy>>shift) at the first stage are adjusted, or an adjustment value, for example 4, is used to respectively adjust the preliminarily determined horizontal coordinate (Xpos+(MVx<<shift)) and the preliminarily determined vertical coordinate (Ypos+(MVy<<shift)) of the upper left corner of the matching block.

When performing alignment adjustment on a reference position corresponding to (Xpos+(MVx>>shift)) and (Ypos+(MVy>>shift)), an adjustment value N (N is a logarithm of the side length of the sub-block by using 2 as a base, in this example, an 8*8 sub-block is taken as an example in this example, that is, N=3) is used.

EXAMPLE 6

Assume that a horizontal motion vector at the first stage is MVx, a vertical motion vector at the first stage is MVy, coordinates of an upper left corner of the current block are (Xpos, Ypos), and a precision of a motion vector is Precision.

In an example, a value of Precision may be 4, 2, 1, ½, ¼, ⅛ or 1/16.

When the value of Precision is 1, ½, ¼, ⅛ or 1/16, coordinates of an upper left corner of the matching block corresponding to the current block are:

$$Mx0=((Xpos+(MVx>>shift))>>3)<<3$$

$$My0=((Ypos+(MVy>>shift))>>3)<<3$$

The value of shift corresponds to Precision one-to-one. When the value of Precision is 1, ½, ¼, ⅛ and 1/16, respectively, the value of shift is 0, 1, 2, 3 and 4, respectively.

When the value of Precision is 4 or 2, the coordinates of the upper left corner of the matching block corresponding to the current block are:

$$Mx0=((Xpos+(MVx<<shift))>>3)<<3$$

$$My0=((Ypos+(MVy<<shift))>>3)<<3$$

The value of shift corresponds to Precision one-to-one. When the value of Precision is 4 and 2, respectively, the value of shift is 2 and 1, respectively.

In this example, alignment adjustment is performed the determined reference position corresponding to (Xpos+(MVx>>shift)) and (Ypos+(MVy>>shift)) using the constant 3.

III. candidate enhanced temporal motion vector prediction modes are determined based on the one or more matching blocks and one or more new matching blocks obtained by offsetting each of the one or more matching blocks, and a temporal candidate mode list is established based on the candidate enhanced temporal motion vector prediction modes (a first temporal candidate mode list for the encoding device, and a second temporal candidate mode list for the decoding device).

In an example, taking the matching block shown in FIG. 7 as an example, it is assumed that a size of the sub-block is 8*8.

EXAMPLE 7

A1 and B2 are clipped into the range of the current CTU, motion information of clipped A1 and B2 is obtained and compared, and a comparing result is recorded as r1 (r1 indicates the same or different in motion information, the same below);

A3 and B4 are clipped into the range of the current CTU, motion information of clipped A3 and B4 is obtained and compared, and a comparing result is recorded as r2;

if at least one of r1 and r2 indicates different in motion information, the matching block is horizontally offset rightward by 8 pixels to obtain a new matching block, and a prediction mode corresponding to the new matching block is taken as a candidate enhanced temporal motion vector prediction mode and added to the temporal candidate mode list.

A2 and B1 are clipped into the range of the current CTU, motion information of clipped A2 and B1 is obtained and compared, and a comparing result is recorded as r3;

A4 and B3 are clipped into the range of the current CTU, motion information of clipped A4 and B3 is obtained and compared, and a comparing result is recorded as r4;

if at least one of r3 and r4 indicates different in motion information, the matching block is horizontally offset leftward by 8 pixels to obtain a new matching block, and a prediction mode corresponding to the new matching block is taken as a candidate enhanced temporal motion vector prediction mode and added to the temporal candidate mode list.

A1 and C3 are clipped into the range of the current CTU, motion information of clipped A1 and C3 is obtained and compared, and a comparing result is recorded as r5;

A2 and C4 are clipped into the range of the current CTU, motion information of clipped A2 and C4 is obtained and compared, and a comparing result is recorded as r6;

if at least one of r5 and r6 indicates different in motion information, the matching block is vertically offset downward by 8 pixels to obtain a new matching block, and a prediction mode corresponding to the new matching block is taken as a candidate enhanced temporal motion vector prediction mode and added to the temporal candidate mode list.

A3 and C1 are clipped into the range of the current CTU, motion information of clipped A3 and C1 is obtained and compared, and a comparing result is recorded as r7;
  A4 and C2 are clipped into the range of the current CTU, motion information of clipped A4 and C2 is obtained and compared, and a comparing result is recorded as r8;
  if at least one of r7 and r8 indicates different in motion information, the matching block is vertically offset upward by 8 pixels to obtain a new matching block, and a prediction mode corresponding to the new matching block is taken as a candidate enhanced temporal motion vector prediction mode and added to the temporal candidate mode list.

A prediction mode corresponding to the original matching block is taken as a candidate enhanced temporal motion vector prediction mode and added to the temporal candidate mode list.

It should be noted that the order in which the prediction mode corresponding to the original matching block and the prediction mode corresponding to the new matching block are added to the temporal candidate mode list is not limited.

In addition, when there are a plurality of new matching blocks, prediction modes corresponding to some of new matching blocks can also be taken as candidate enhanced temporal motion vector prediction modes and added to the temporal candidate mode list.

When there is no new matching block, the prediction mode corresponding to the original matching block is taken as a candidate enhanced temporal motion vector prediction mode and added to the temporal candidate mode list.

Figure 8A:
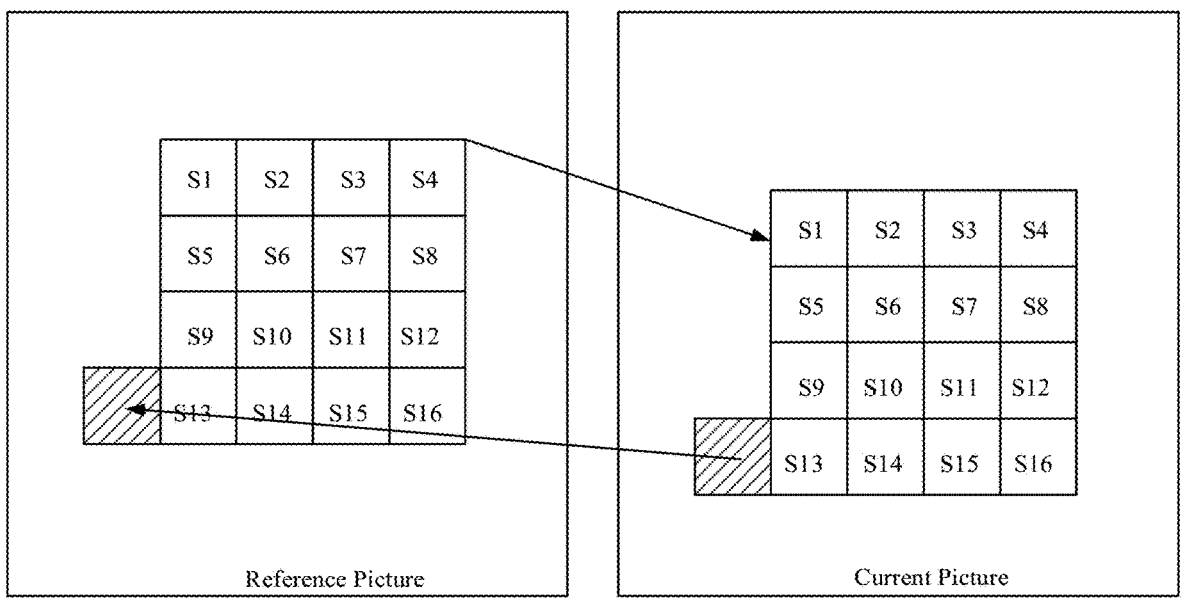
FIGS. 8A to 8E are schematic diagrams illustrating offsetting a matching block according to an exemplary embodiment of the present disclosure.
Figure 8B:
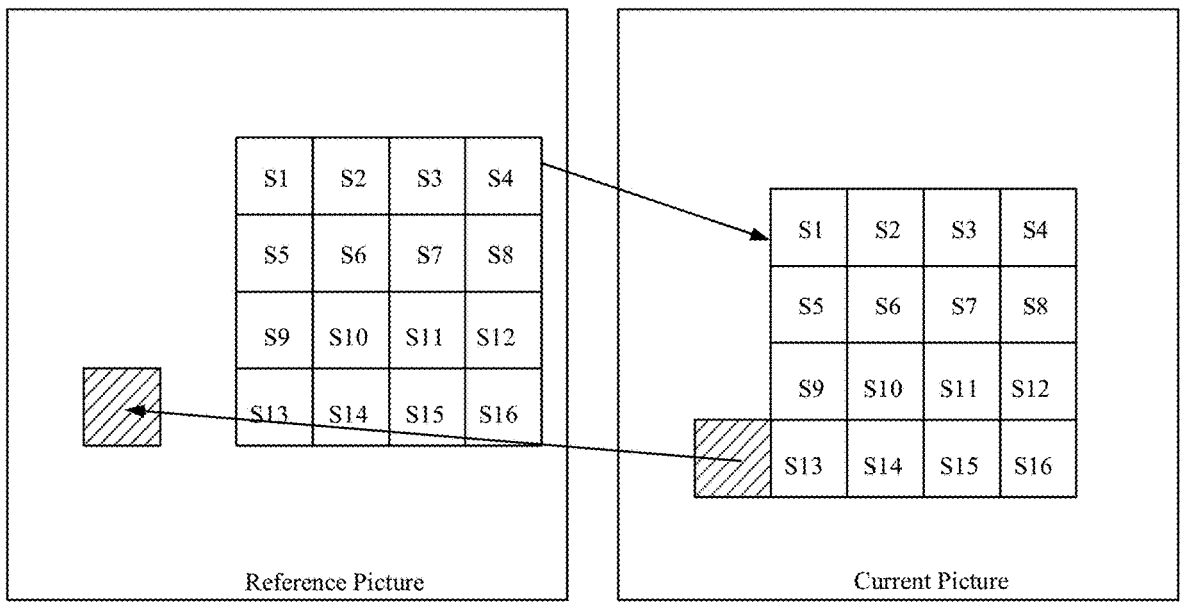
Figure 8C:
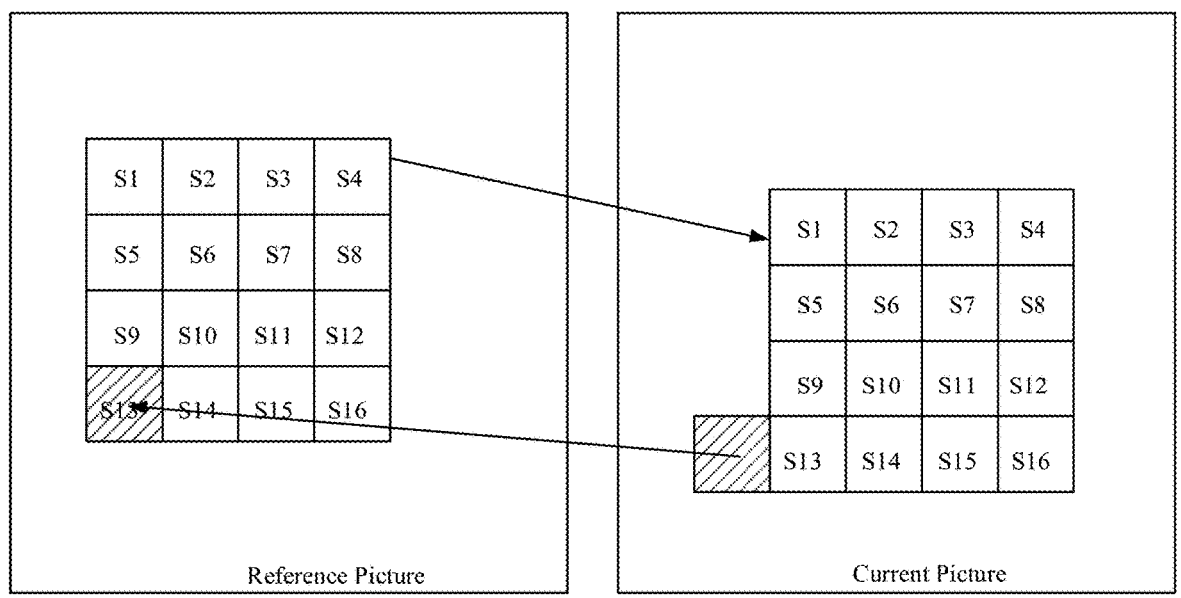
Figure 8D:
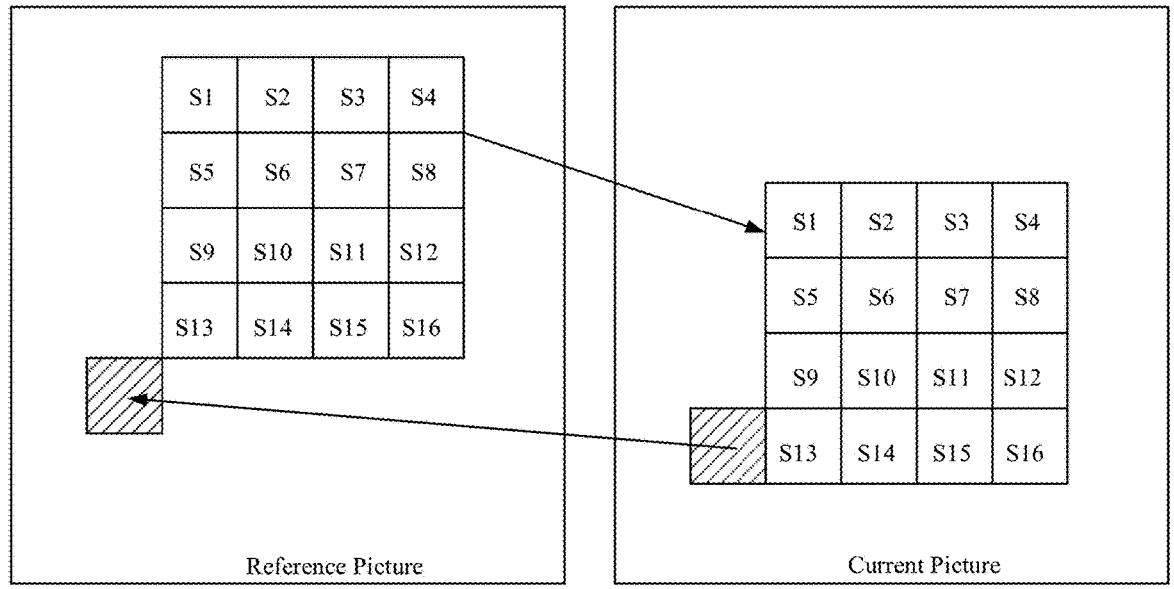
Figure 8E:
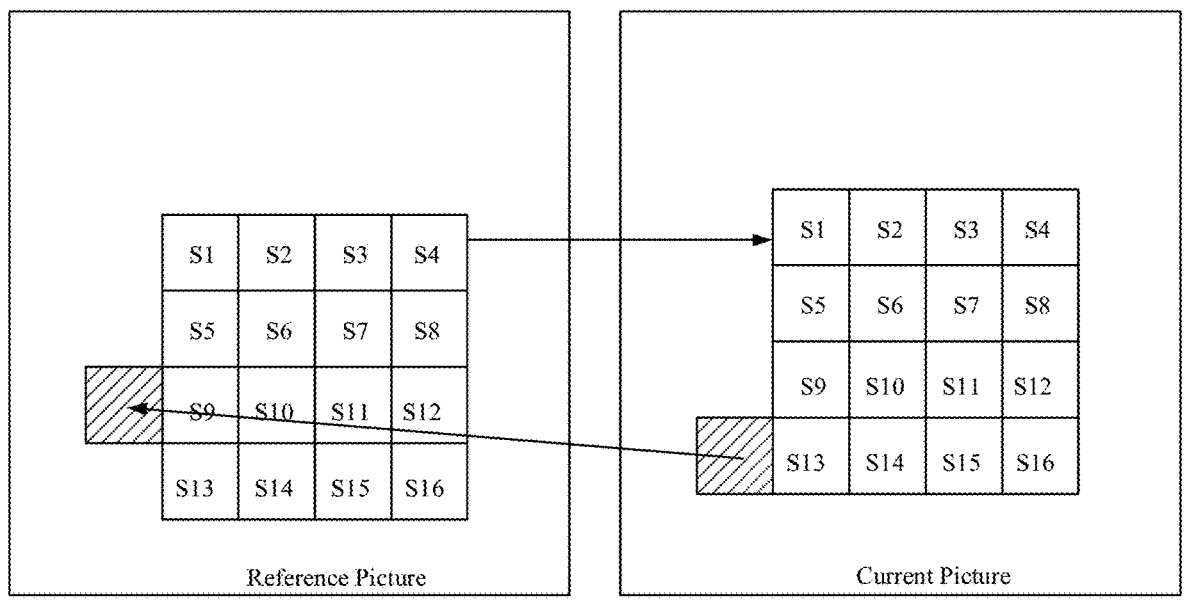

In an example, a schematic diagram of the determined matching block can be shown in FIG. 8A; a schematic diagram of a new matching block obtained by horizontally offsetting the matching block rightward by 8 pixels can be shown in FIG. 8B; a schematic diagram of a new matching block obtained by horizontally offsetting the matching block leftward by 8 pixels can be shown in FIG. 8C; a schematic diagram of a new matching block obtained by vertically offsetting the matching block upward by 8 pixels can be shown in FIG. 8D; a schematic diagram of a new matching block obtained by vertically offsetting the matching block downward by 8 pixels can be shown in FIG. 8E.

EXAMPLE 8

One or more matching blocks are clipped into the range of the current CTU.

It is assumed that the matching block shown in FIG. 7 is a clipped matching block.

When a right boundary of the clipped matching block is not in a position of a right boundary of the current CTU, motion information of A1 and B2 is obtained and compared, and a comparing result is recorded as r9 (r9 indicates the same or different in motion information, the same below);
  motion information of A3 and B4 is obtained and compared, and a comparing result is recorded as r10;
  if at least one of r9 and r10 indicates different in motion information, the clipped matching block is horizontally offset rightward by 8 pixels to obtain a new matching block, and a prediction mode corresponding to the new matching block is taken as a candidate enhanced temporal motion vector prediction mode and added to the temporal candidate mode list.

When a left boundary of the clipped matching block is not in a position of a left boundary of the current CTU, motion information of A2 and B1 is obtained and compared, and a comparing result is recorded as r11;
  motion information of A4 and B3 is obtained and compared, and a comparing result is recorded as r12;
  if at least one of r11 and r12 indicates different in motion information, the clipped matching block is horizontally offset leftward by 8 pixels to obtain a new matching block, and a prediction mode corresponding to the new matching block is taken as a candidate enhanced temporal motion vector prediction mode and added to the temporal candidate mode list.

When a lower boundary of the clipped matching block is not in a position of a lower boundary of the current CTU, motion information of A1 and C3 is obtained and compared, and a comparing result is recorded as r13;
  motion information of A2 and C4 is obtained and compared, and a comparing result is recorded as r14;
  if at least one of r13 and r14 indicates different in motion information, the clipped matching block is vertically offset downward by 8 pixels to obtain a new matching block, and a prediction mode corresponding to the new matching block is taken as a candidate enhanced temporal motion vector prediction mode and added to the temporal candidate mode list.

When an upper boundary of the clipped matching block is not in an position of an upper boundary of the current CTU, motion information of A3 and C1 is obtained and compared, and a comparing result is recorded as r15;
  motion information of A4 and C2 is obtained and compared, and a comparing result is recorded as r16;
  if at least one of r15 and r16 indicates different in motion information, the clipped matching block is vertically offset upward by 8 pixels to obtain a new matching block, and a prediction mode corresponding to the new matching block is taken as a candidate enhanced temporal motion vector prediction mode and added to the temporal candidate mode list.

Prediction modes corresponding to the one or more matching blocks before the offsetting are taken as candidate enhanced temporal motion vector prediction modes and added to the temporal candidate mode list.

It should be noted that the order in which the prediction modes corresponding to the one or more matching blocks before the offsetting and the prediction modes corresponding to the one or more new matching blocks obtained by offsetting are added to the temporal candidate mode list is not limited.

In addition, when there are a plurality of new matching blocks, prediction modes corresponding to some of the new matching blocks can also be taken as candidate enhanced temporal motion vector prediction modes and added to the temporal candidate mode list.

When there is no new matching block, the prediction mode corresponding to the matching block before the offsetting is taken as a candidate enhanced temporal motion vector prediction mode and added to the temporal candidate mode list.

EXAMPLE 9

An original matching block is offset to obtain a new matching block.

In an example, the offset is as follows:

$Mx1=Mx0+offset1$ $My1=My0+offset2$

Mx0 and My0 are horizontal and vertical coordinates of an upper left corner of an original matching block, respectively, Mx1 and My1 are horizontal and vertical coordinates of an upper left corner of a new matching block, respectively, offset1 and offset2 are offsets, and values of offset1 and offset2 are arbitrary integers.

A prediction mode corresponding to the new matching block is taken as a candidate enhanced temporal motion vector prediction mode and added to a temporal candidate mode list.

A prediction mode corresponding to the original matching block is taken as a candidate enhanced temporal motion vector prediction mode and added to the temporal candidate mode list.

It should be noted that the order in which the prediction mode corresponding to the original matching block and the prediction mode corresponding to the new matching block are added to the temporal candidate mode list is not limited.

Offset1 and offset2 can take a plurality of sets of values to obtain a plurality of new matching blocks, and the number of the new matching blocks is not limited.

When there are a plurality of new matching blocks, prediction modes corresponding to some of new matching blocks can also be taken as candidate enhanced temporal motion vector prediction modes and added to the temporal candidate mode list.

EXAMPLE 10

A1 and B2 are clipped into the range of the current CTU, motion information of clipped A1 and B2 is obtained and compared, and a comparing result is recorded as r1 (r1 indicates the same or different in motion information, the same below);
   A3 and B4 are clipped into the range of the current CTU, motion information of clipped A3 and B4 is obtained and compared, and a comparing result is recorded as r2;
   if at least one of r1 and r2 indicates different in motion information, the matching block is horizontally offset rightward by 8 pixels to obtain a new matching block, and a prediction mode corresponding to the new matching block is taken as a candidate enhanced temporal motion vector prediction mode and added to the temporal candidate mode list.
   A2 and B1 are clipped into the range of the current CTU, motion information of clipped A2 and B1 is obtained and compared, and a comparing result is recorded as r3;
   A4 and B3 are clipped into the range of the current CTU, motion information of clipped A4 and B3 is obtained and compared, and a comparing result is recorded as r4;
   if at least one of r3 and r4 indicates different in motion information, the matching block is horizontally offset leftward by 8 pixels to obtain a new matching block, and a prediction mode corresponding to the new matching block is taken as a candidate enhanced temporal motion vector prediction mode and added to the temporal candidate mode list.
   A1 and C3 are clipped into the range of the current CTU, motion information of clipped A1 and C3 is obtained and compared, and a comparing result is recorded as r5;
   A2 and C4 are clipped into the range of the current CTU, motion information of clipped A2 and C4 is obtained and compared, and a comparing result is recorded as r6;
   if at least one of r5 and r6 indicates different in motion information, the matching block is vertically offset downward by 8 pixels to obtain a new matching block, and a prediction mode corresponding to the new matching block is taken as a candidate enhanced temporal motion vector prediction mode and added to the temporal candidate mode list.
   A3 and C1 are clipped into the range of the current CTU, motion information of clipped A3 and C1 is obtained and compared, and a comparing result is recorded as r7;
   A4 and C2 are clipped into the range of the current CTU, motion information of clipped A4 and C2 is obtained and compared, and a comparing result is recorded as r8;
   if at least one of r7 and r8 indicates different in motion information, the matching block is vertically offset upward by 8 pixels to obtain a new matching block, and a prediction mode corresponding to the new matching block is taken as a candidate enhanced temporal motion vector prediction mode and added to the temporal candidate mode list.

It should be noted that, when there are a plurality of new matching blocks, the order in which the prediction mode corresponding to each new matching block is added to the temporal candidate mode list is not limited.

In addition, when there are a plurality of new matching blocks, prediction modes corresponding to some of the new matching blocks may also be taken as candidate enhanced temporal motion vector prediction modes and added to the temporal candidate mode list.

When there is no new matching block, a prediction mode corresponding to an original matching block is taken as a candidate enhanced temporal motion vector prediction mode and added to the temporal candidate mode list.

EXAMPLE 11

One or more matching block are clipped into the range of the current CTU.

It is assumed that the matching block shown in FIG. 7 is a clipped matching block.

When a right boundary of the clipped matching block is not in a position of a right boundary of the current CTU, motion information of A1 and B2 is obtained and compared, and a comparing result is recorded as r9 (r9 indicates the same or different in motion information, the same below);
   motion information of A3 and B4 is obtained and compared, and a comparing result is recorded as r10;
   if at least one of r9 and r10 indicates different in motion information, the clipped matching block is horizontally offset rightward by 8 pixels to obtain a new matching block, and a prediction mode corresponding to the new matching block is taken as a candidate enhanced temporal motion vector prediction mode and added to the temporal candidate mode list.

When a left boundary of the clipped matching block is not in a position of a left boundary of the current CTU, motion information of A2 and B1 is obtained and compared, and a comparing result is recorded as r11;
   motion information of A4 and B3 is obtained and compared, and a comparing result is recorded as r12;
   if at least one of r11 and r12 indicates different in motion information, the clipped matching block is horizontally offset leftward by 8 pixels to obtain a new matching block, and a prediction mode corresponding to the new matching block is taken as a candidate enhanced temporal motion vector prediction mode and added to the temporal candidate mode list.

When a lower boundary of the clipped matching block is not in a position of a lower boundary of the current CTU, motion information of A1 and C3 is obtained and compared, and a comparing result is recorded as r13;

motion information of A2 and C4 is obtained and compared, and a comparing result is recorded as r14;

if at least one of r13 and r14 indicates different in motion information, the clipped matching block is vertically offset downward by 8 pixels to obtain a new matching block, and a prediction mode corresponding to the new matching block is taken as a candidate enhanced temporal motion vector prediction mode and added to the temporal candidate mode list.

When an upper boundary of the clipped matching block is not in an position of an upper boundary of the current CTU, motion information of A3 and C1 is obtained and compared, and a comparing result is recorded as r15;

motion information of A4 and C2 is obtained and compared, and a comparing result is recorded as r16;

if at least one of r15 and r16 indicates different in motion information, the clipped matching block is vertically offset upward by 8 pixels to obtain a new matching block, and a prediction mode corresponding to the new matching block is taken as a candidate enhanced temporal motion vector prediction mode and added to the temporal candidate mode list.

It should be noted that the order in which prediction modes corresponding to the one or more matching blocks before the offsetting and prediction modes corresponding to the one or more new matching blocks obtained by offsetting are added to the temporal candidate mode list is not limited.

In addition, when there are a plurality of new matching blocks, prediction modes corresponding to some of the new matching blocks can also be taken as candidate enhanced temporal motion vector prediction modes and added to the temporal candidate mode list.

When there is no new matching block, the prediction mode corresponding to the matching block before the offsetting is taken as a candidate enhanced temporal motion vector prediction mode and added to the temporal candidate mode list.

EXAMPLE 12

An original matching block is offset to obtain a new matching block.

In an example, the offset is as follows:

$$Mx1=Mx0+offset1$$

$$My1=My0+offset2$$

Mx0 and My0 are horizontal and vertical coordinates of an upper left corner of an original matching block, respectively, Mx1 and My1 are horizontal and vertical coordinates of an upper left corner of a new matching block, respectively, offset1 and offset2 are offsets, and values of offset1 and offset2 are arbitrary integers.

Prediction modes corresponding to the one or more new matching blocks are taken as candidate enhanced temporal motion vector prediction modes and added to a temporal candidate mode list.

It should be noted that offset1 and offset2 can take a plurality of sets of values to obtain a plurality of new matching blocks, and the number of the new matching blocks is not limited.

When there are a plurality of new matching blocks, the order in which prediction modes corresponding to the new matching blocks are added to the temporal candidate mode list is not limited.

When there are a plurality of new matching blocks, prediction modes corresponding to some of new matching blocks can also be taken as candidate enhanced temporal motion vector prediction modes and added to the temporal candidate mode list.

IV. motion information of all sub-blocks in the current block is obtained according to motion information of a matching block, and motion compensation is performed on each sub-block in the current block according to the motion information of each sub-block in the current block.

In an example, for the encoding device, the matching block includes a matching block corresponding to any candidate enhanced temporal motion vector prediction mode in a temporal candidate mode list (referred to as a target candidate matching block in the present disclosure);

For the decoding device, the matching block includes the matching block corresponding to the enhanced temporal motion vector prediction mode (i.e., the above target matching block).

EXAMPLE 13

For any sub-block in the matching block, if both forward motion information and backward motion information of the sub-block are available, the forward motion information and the backward motion information of the sub-block are scaled to the first picture in reference picture List0 and the first picture in reference picture List1 respectively, and the scaled forward motion information and the scaled backward motion information are assigned to a sub-block at a corresponding position in the current block.

If forward motion information of the sub-block is available, but backward motion information of the sub-block is unavailable, the forward motion information of the sub-block is scaled to the first picture in reference picture List0, and the scaled forward motion information is assigned to sub-blocks at the corresponding positions in the current block.

If backward motion information of the sub-block is available, but forward motion information of the sub-block is unavailable, the backward motion information of the sub-block is scaled to the first picture in reference picture List1, and the scaled backward motion information is assigned to sub-blocks at the corresponding positions in the current block.

Motion compensation is performed on each sub-block in the current block according to the motion information of each sub-block in the current block.

EXAMPLE 14

For any sub-block in the matching block, if both forward motion information and backward motion information of the sub-block are available, the forward motion information and the backward motion information of the sub-block are scaled to the first picture in reference picture List0 and the first picture in reference picture List1 respectively, and the scaled forward motion information and the scaled backward motion information are assigned to a sub-block at a corresponding position in the current block.

If forward motion information of the sub-block is available, but backward motion information of the sub-block is unavailable, the forward motion information of the sub-block is scaled to the first picture in reference picture List0, and the scaled forward motion information is assigned to sub-blocks at the corresponding positions in the current block.

If backward motion information of the sub-block is available, but forward motion information of the sub-block is unavailable, the backward motion information of the sub-block is scaled to the first picture in reference picture List1, and the scaled backward motion information is assigned to sub-blocks at the corresponding positions in the current block.

If forward motion information and backward motion information of the sub-block in the matching block are both unavailable, when both forward motion information and backward motion information of a second surrounding block of the current block are available, the forward motion information and the backward motion information of the second surrounding block are scaled to the first picture in reference picture List0 and the first picture in reference picture List1 respectively, and the scaled forward motion information and the scaled backward motion information are assigned to a sub-block at a corresponding position in the current block;

when forward motion information of the second surrounding block is available, but backward motion information of the second surrounding block is unavailable, the forward motion information of the second surrounding block is scaled to the first picture in reference picture List0, and the scaled forward motion information is assigned to a sub-block at a corresponding position in the current block;

when backward motion information of the second surrounding block is available, but forward motion information of the second surrounding block is unavailable, the backward motion information of the second surrounding block is scaled to the first picture in reference picture List1, and the scaled backward motion information is assigned to a sub-block at a corresponding position in the current block;

when forward motion information and backward motion information of the second surrounding block are both unavailable, zero motion information is assigned to a sub-block at a corresponding position in the current block.

Motion compensation is performed on each sub-block in the current block according to the motion information of each sub-block in the current block.

The control of whether the enhanced temporal motion vector prediction technology is enabled will be described below.

EXAMPLE 15

A SPS level syntax can be added to control whether ETMVP is enabled.

For example, u(n), u(v) or ue(n), ue(v) can be selected for encoding, where u(n) represents reading in consecutive n bits, and is an unsigned number after being decoded, ue(n) represents unsigned exponential Golomb entropy encoding. When the parameter in brackets in the descriptor is n, it indicates that the syntax element is fixed-length encoding, and when the parameter is v, it indicates that the syntax element is variable-length encoding. The selected encoding method is not limited.

In an example, u(1) is used for encoding, and the control of whether ETMVP is enabled is implemented by one bit.

The methods provided by the present disclosure are described above. Apparatuses provided by the present disclosure are described below.

Figure 9:
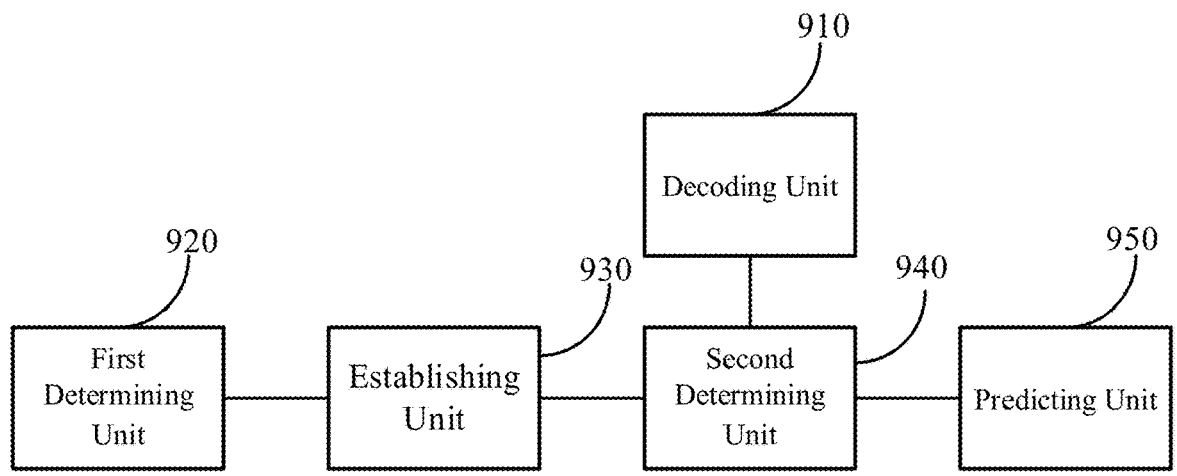
FIG. 9 is a schematic structural diagram illustrating a decoding apparatus according to an exemplary embodiment of the present disclosure.

Please refer to FIG. 9, which is a schematic structural diagram of a decoding apparatus according to an embodiment of the present disclosure, the apparatus may include:
a decoding unit 910, configured to obtain index information of an enhanced temporal motion vector prediction mode from a bit stream of a current block when it is determined that an enhanced temporal motion vector prediction technology is enabled for the current block;
a first determining unit 920, configured to determine one or more matching blocks of the current block;
an establishing unit 930, configured to determine candidate enhanced temporal motion vector prediction modes based on the one or more matching blocks and one or more new matching blocks obtained by offsetting each of the one or more matching blocks, and establish a temporal candidate mode list based on the candidate enhanced temporal motion vector prediction modes;
a second determining unit 940, configured to determine, based on the index information, the enhanced temporal motion vector prediction mode from the temporal candidate mode list;
a predicting unit 950, configured to determine motion information of each sub-block in the current block based on the determined enhanced temporal motion vector prediction mode, and perform motion compensation on each sub-block in the current block based on the motion information of each sub-block in the current block,
where the predicting unit 950 is further configured to:
for any sub-block in a target matching block, if both forward motion information and backward motion information of the sub-block are available, scale the forward motion information and the backward motion information of the sub-block to the first picture in reference picture List0 and the first picture in reference picture List1 respectively, and assign the scaled forward motion information and the scaled backward motion information to a sub-block at a corresponding position in the current block; or
if forward motion information of the sub-block is available but backward motion information of the sub-block is unavailable, scale the forward motion information of the sub-block to the first picture in reference picture List0, and assign the scaled forward motion information to a sub-block at a corresponding position in the current block;
or if backward motion information of the sub-block is available but forward motion information of the sub-block is unavailable, scale the backward motion information of the sub-block to the first picture in reference picture List1, and assign the scaled backward motion information to a sub-block at a corresponding position in the current block,
where a sequence parameter set level syntax is used to indicate whether the enhanced temporal motion vector prediction technology is enabled for the current block,
where, when determining the one or more matching blocks of the current block, the first determining unit 920 is further configured to: determine the one or more matching blocks of the current block at least based on a target reference picture index, a target reference direction and a position of the current block, where the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1.

In an example, the establishing unit 930 is configured to, for a respective matching block of the one or more matching blocks, based on one or more offset pairs, horizontally and vertically offset the respective matching block to obtain one or more new matching blocks.

In an example, the establishing unit 930 is configured to clip each of the one or more matching blocks to obtain one or more clipped matching blocks.

In an example, the establishing unit 930 is configured to:
for a respective clipped matching block of the one or more clipped matching blocks, compare the motion information of a thirteenth sub-block and the motion information of a fourteenth sub-block, and compare the motion information of a fifteenth sub-block and the motion information of a sixteenth sub-block, to obtain two comparing results, if at least one of the two comparing results indicates different in motion information, horizontally offset the clipped matching block rightward to obtain a new matching block; or
compare the motion information of a seventeenth sub-block and the motion information of an eighteenth sub-block, and compare the motion information of a nineteenth sub-block and the motion information of a twentieth sub-block, to obtain two comparing results, if at least one of the two comparing results indicates different in motion information, horizontally offset the clipped matching block leftward to obtain a new matching block; or
compare the motion information of a thirteenth sub-block and the motion information of a twenty-first sub-block, and compare the motion information of a seventeenth sub-block and the motion information of a twenty-second sub-block, to obtain two comparing results, if at least one of the two comparing results indicates different in motion information, vertically offset the clipped matching block downward to obtain a new matching block; or
compare the motion information of a fifteenth sub-block and the motion information of a twenty-third sub-block, and compare the motion information of a nineteenth sub-block and the motion information of a twenty-fourth sub-block, to obtain two comparing results, if at least one of the two comparing results indicates different in motion information, vertically offset the clipped matching block upward to obtain a new matching block;
where the thirteenth sub-block is a sub-block in an up-left side of the clipped matching block, the fourteenth sub-block is a first sub-block in a right side of the clipped matching block, the fifteenth sub-block is a sub-block in a down-left side of the clipped matching block, the sixteenth sub-block is a last sub-block in a right side of the clipped matching block, the seventeenth sub-block is a sub-block in an up-right side of the clipped matching block, the eighteenth sub-block is a first sub-block in a left side of the clipped matching block, the nineteenth sub-block is a sub-block in a down-right side of the clipped matching block, the twentieth sub-block is a last sub-block in a left side of the clipped matching block, the twenty-first sub-block is a first sub-block in a down side of the clipped matching block, the twenty-second sub-block is a last sub-block in a down side of the clipped matching block, the twenty-third sub-block is a first sub-block in an up side of the clipped matching block, and the twenty-fourth sub-block is a last sub-block in an up side of the clipped matching block; one unit is the size of the sub block.

In an example, the establishing unit 930 is configured to:
when there are one or more new matching blocks, determine, prediction modes corresponding to the one or more matching blocks before the offsetting and prediction modes corresponding to the one or more new matching blocks obtained by the offsetting, as the candidate enhanced temporal motion vector prediction modes.

In an example, the predicting unit 950 is further configured to:
if forward motion information and backward motion information of the sub-block are both unavailable, when both forward motion information and backward motion information of a second surrounding block of the current block are available, scale the forward motion information and the backward motion information of the second surrounding block to the first picture in reference picture List0 and the first picture in reference picture List1 respectively, and assign the scaled forward motion information and the scaled backward motion information to a sub-block at a corresponding position in the current block; or when forward motion information of the second surrounding block is available, but backward motion information of the second surrounding block is unavailable, scale the forward motion information of the second surrounding block to the first picture in reference picture List0, and assign the scaled forward motion information to a sub-block at a corresponding position in the current block; or when backward motion information of the second surrounding block is available, but forward motion information of the second surrounding block is unavailable, scale the backward motion information of the second surrounding block to the first picture in reference picture List1, and assign the scaled backward motion information to a sub-block at a corresponding position in the current block; or when forward motion information and backward motion information of the second surrounding block are both unavailable, assign zero motion information to a sub-block at a corresponding position in the current block.

In an example, when the sequence parameter set level syntax is used to indicate whether the enhanced temporal motion vector prediction technology is enabled for the current block, the decoding unit 910 is configured to:
when the enhanced temporal motion vector prediction technology is enabled for an image sequence to which the current block belongs, determine that the enhanced temporal motion vector prediction technology is enabled for the current block; or
when the enhanced temporal motion vector prediction technology is disabled for an image sequence to which the current block belongs, determine that the enhanced temporal motion vector prediction technology is disabled for the current block.

In an example, the above-mentioned decoding apparatus may include a video decoder.

Figure 10:
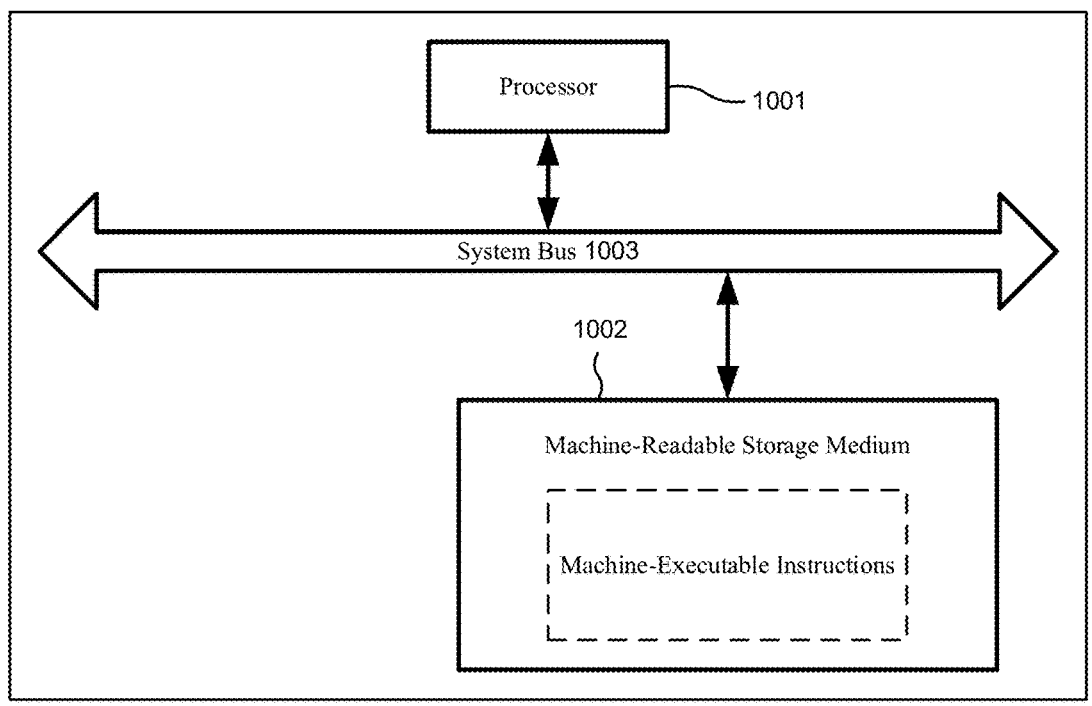
FIG. 10 is a schematic diagram illustrating a hardware structure of a decoding device according to an exemplary embodiment of the present disclosure.

Please refer to FIG. 10, which is a schematic diagram of a hardware structure of a decoding device according to an embodiment of the present disclosure. The decoding device may include a processor 1001 and a machine-readable storage medium 1002 storing machine-executable instructions. The processor 1001 and the machine-readable storage medium 1002 can communicate via a system bus 1003. By reading and executing machine-executable instructions corresponding to the decoding control logic in the machine-readable storage medium 1002, the processor 1001 can perform the decoding methods described above.

The machine-readable storage medium 1002 referred to herein can be any electronic, magnetic, optical, or other physical storage device that can contain or store information, such as executable instructions, data. For example, the machine-readable storage medium may be: a Random Access Memory (RAM), a volatile memory, a non-volatile memory, a flash memory, a storage drive (such as a hard disk drive), a solid state drive, any type of storage disk (such as CD-ROM, DVD), or similar storage media, or a combination thereof.

In some embodiments, there is also provided a machine-readable storage medium having stored thereon machine-executable instructions that, when executed by a processor, implement the above-described decoding methods. For example, the machine-readable storage medium may be a ROM, a RAM, a CD-ROM, a magnetic tape, a floppy disk, an optical data storage device, and the like.

Figure 11:
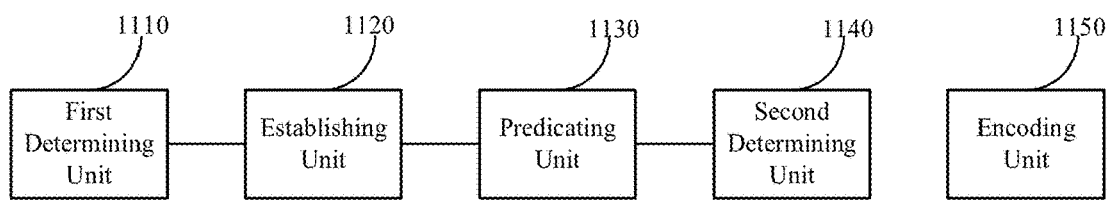
FIG. 11 is a schematic structural diagram illustrating an encoding apparatus according to an exemplary embodiment of the present disclosure.

Please refer to FIG. 11, which is a schematic structural diagram of an encoding apparatus according to an embodiment of the present disclosure, the apparatus may include:
a first determining unit 1110, configured to determine one or more matching blocks of a current block;
an establishing unit 1120, configured to determine candidate enhanced temporal motion vector prediction modes based on the one or more matching blocks and one or more new matching blocks obtained by offsetting each of the one or more matching blocks, and establish a first temporal candidate mode list based on the candidate enhanced temporal motion vector prediction modes;
a predicting unit 1130, configured to traverse the candidate enhanced temporal motion vector prediction modes in the first temporal candidate mode list, and for any of the candidate enhanced temporal motion vector prediction modes, determine motion information of each sub-block in the current block based on the candidate enhanced temporal motion vector prediction mode, and perform motion compensation on each sub-block in the current block based on the motion information of each sub-block in the current block,
where the predicting unit 1130 is further configured to:
for any sub-block in a target matching block, if both forward motion information and backward motion information of the sub-block are available, scale the forward motion information and the backward motion information of the sub-block to the first picture in reference picture List0 and the first picture in reference picture List1 respectively, and assign the scaled forward motion information and the scaled backward motion information to a sub-block at a corresponding position in the current block; or
if forward motion information of the sub-block is available but backward motion information of the sub-block is unavailable, scale the forward motion information of the sub-block to the first picture in reference picture List0, and assign the scaled forward motion information to a sub-block at a corresponding position in the current block; or
if backward motion information of the sub-block is available but forward motion information of the sub-block is unavailable, scale the backward motion information of the sub-block to the first picture in reference picture List1, and assign the scaled backward motion information to a sub-block at a corresponding position in the current block,
a second determining unit 1140, configured to determine, based on a rate-distortion cost corresponding to each candidate enhanced temporal motion vector prediction mode in the temporal candidate mode list, a candidate enhanced temporal motion vector prediction mode with a smallest rate-distortion cost as an enhanced temporal motion vector prediction mode of the current block;
an encoding unit 1150, configured to carry index information in a bit stream of the current block, where the index information is used to indicate a mode index of the determined enhanced temporal motion vector prediction mode,
where, when determining the one or more matching blocks of the current block, the first determining unit 1110 is further configured to: determine the one or more matching blocks of the current block at least based on a target reference picture index, a target reference direction and a position of the current block, where the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1.

In an example, the establishing unit 1120 is configured to clip each of the one or more matching blocks to obtain clipped one or more matching blocks.

In an example, the establishing unit 1120 is configured to:
for a respective clipped matching block of the one or more clipped matching blocks, compare the motion information of a thirteenth sub-block and the motion information of a fourteenth sub-block, and compare the motion information of a fifteenth sub-block and the motion information of a sixteenth sub-block, to obtain two comparing results, if at least one of the two comparing results indicates different in motion information, horizontally offset the clipped matching block rightward to obtain a new matching block; or
compare the motion information of a seventeenth sub-block and the motion information of an eighteenth sub-block, and compare the motion information of a nineteenth sub-block and the motion information of a twentieth sub-block, to obtain two comparing results, if at least one of the two comparing results indicates different in motion information, horizontally offset the clipped matching block leftward to obtain a new matching block; or
compare the motion information of a thirteenth sub-block and the motion information of a twenty-first sub-block, and compare the motion information of a seventeenth sub-block and the motion information of a twenty-second sub-block, to obtain two comparing results, if at least one of the two comparing results indicates different in motion information, vertically offset the clipped matching block downward to obtain a new matching block; or
compare the motion information of a fifteenth sub-block and the motion information of a twenty-third sub-block, and compare the motion information of a nineteenth sub-block and the motion information of a twenty-fourth sub-block, to obtain two comparing results, if at least one of the two comparing results indicates different in motion information, vertically offset the clipped matching block upward to obtain a new matching block;

where the thirteenth sub-block is a sub-block in an up-left side of the clipped matching block, the fourteenth sub-block is a first sub-block in a right side of the clipped matching block, the fifteenth sub-block is a sub-block in a down-left side of the clipped matching block, the sixteenth sub-block is a last sub-block in a right side of the clipped matching block, the seventeenth sub-block is a sub-block in an up-right side of the clipped matching block, the eighteenth sub-block is a first sub-block in a left side of the clipped matching block, the nineteenth sub-block is a sub-block in a down-right side of the clipped matching block, the twentieth sub-block is a last sub-block in a left side of the clipped matching block, the twenty-first sub-block is a first sub-block in a down side of the clipped matching block, the twenty-second sub-block is a last sub-block in a down side of the clipped matching block, the twenty-third sub-block is a first sub-block in an up side of the clipped matching block, and the twenty-fourth sub-block is a last sub-block in an up side of the clipped matching block; one unit is the size of the sub block.

In an example, the establishing unit 1120 is configured to:
when there are one or more new matching blocks, determine, prediction modes corresponding to the one or more matching blocks before the offsetting and prediction modes corresponding to the one or more new matching blocks obtained by the offsetting, as the candidate enhanced temporal motion vector prediction modes.

In an example, the predicting unit 1130 is further configured to:
if forward motion information and backward motion information of the sub-block are both unavailable, when both forward motion information and backward motion information of a second surrounding block of the current block are available, scale the forward motion information and the backward motion information of the second surrounding block to the first picture in reference picture List0 and the first picture in reference picture List1 respectively, and assign the scaled forward motion information and the scaled backward motion information to a sub-block at a corresponding position in the current block; or when forward motion information of the second surrounding block is available, but backward motion information of the second surrounding block is unavailable, scale the forward motion information of the second surrounding block to the first picture in reference picture List0, and assign the scaled forward motion information to a sub-block at a corresponding position in the current block; or when backward motion information of the second surrounding block is available, but forward motion information of the second surrounding block is unavailable, scale the backward motion information of the second surrounding block to the first picture in reference picture List1, and assign the scaled backward motion information to a sub-block at a corresponding position in the current block; or when forward motion information and backward motion information of the second surrounding block are both unavailable, assign zero motion information to a sub-block at a corresponding position in the current block.

In an example, the establishing unit 1120 is configured to, when an enhanced temporal motion vector prediction technology is enabled for the current block, determine candidate enhanced temporal motion vector prediction modes based on the one or more matching blocks and one or more new matching blocks obtained by offsetting each of the one or more matching blocks, and establish a first temporal candidate mode list based on the candidate enhanced temporal motion vector prediction modes.

In an example, a sequence parameter set level syntax is used to control whether the enhanced temporal motion vector prediction technology is enabled for the current block.

In an example, the above-mentioned encoding apparatus may include a video encoder.

Figure 12:
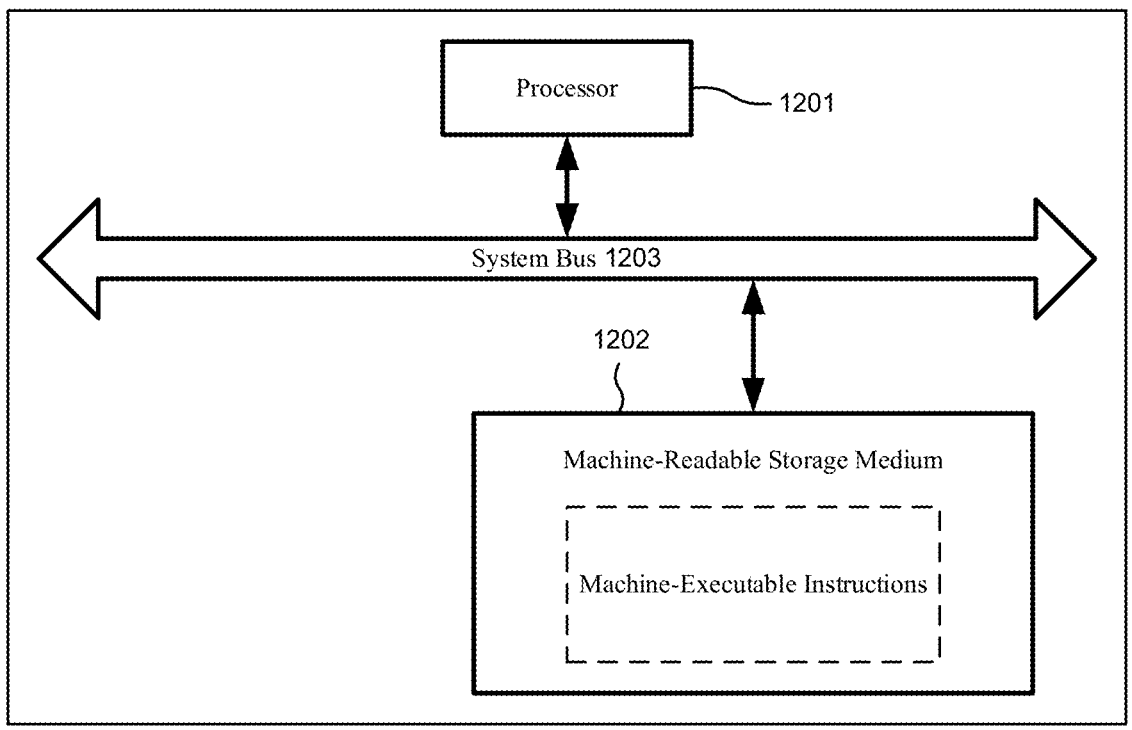
FIG. 12 is a schematic diagram illustrating a hardware structure of an encoding device according to an exemplary embodiment of the present disclosure.

Please refer to FIG. 12, which is a schematic diagram of a hardware structure of a encoding device according to an embodiment of the present disclosure. The encoding device may include a processor 1201 and a machine-readable storage medium 1202 storing machine-executable instructions. The processor 1201 and the machine-readable storage medium 1202 can communicate via a system bus 1203. By reading and executing machine-executable instructions corresponding to the encoding control logic in the machine-readable storage medium 1202, the processor 1201 can perform the encoding methods described above.

The machine-readable storage medium 1202 referred to herein can be any electronic, magnetic, optical, or other physical storage device that can contain or store information, such as executable instructions, data. For example, the machine-readable storage medium may be: a Random Access Memory (RAM), a volatile memory, a non-volatile memory, a flash memory, a storage drive (such as a hard disk drive), a solid state drive, any type of storage disk (such as CD-ROM, DVD), or similar storage media, or a combination thereof.

In some embodiments, there is also provided a machine-readable storage medium having stored thereon machine-executable instructions that, when executed by a processor, implement the above-described encoding methods. For example, the machine-readable storage medium may be a ROM, a RAM, a CD-ROM, a magnetic tape, a floppy disk, an optical data storage device, and the like.

In some embodiments, there is also provided a camera device, including the encoding apparatus in any of the above embodiments and the decoding apparatus in any of the above embodiments.

It should be noted that relational terms such as "first" and "second" are only used to differ an entity or operation from another entity or operation in this specification, and do not require or imply any real relationship or sequence among these entities or operations. Furthermore, terms "include", "contain" or any of their derivatives are intended to convey a non-exclusive connotation, so that a process, a method, an article or a device including a series of elements not only includes such elements, but also includes other elements that are not listed explicitly, or further includes inherent elements of the process, the method, the article or the device. If no more limitations are made, an element limited by "include a/an . . . " does not exclude another same element existing in the process, the method, the article, or the device that includes the element.

The foregoing descriptions are merely exemplary embodiments of the present disclosure, and are not intended to limit the protection scope of the present disclosure. Any modification, equivalent replacement, and improvement made without departing from the spirit and principle of the present disclosure all fall within the protection scope of the present disclosure.

The invention claimed is:

1. A decoding method, comprising:

obtaining index information of an enhanced temporal motion vector prediction mode from a bit stream of a current block when it is determined that an enhanced temporal motion vector prediction technology is enabled for the current block;

determining one or more matching blocks of the current block, wherein the one or more matching blocks refer to one or more image blocks corresponding to the current block in a target reference picture, comprising:
  determining one or more matching blocks of the current block at least based on a target reference picture index, a target reference direction and a position of the current block, wherein the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1;

determining candidate enhanced temporal motion vector prediction modes based on the one or more matching blocks and one or more new matching blocks obtained by offsetting each of the one or more matching blocks, and establishing a temporal candidate mode list based on the candidate enhanced temporal motion vector prediction modes;

based on the index information, determining the enhanced temporal motion vector prediction mode from the temporal candidate mode list;

determining motion information of each sub-block in the current block based on the determined enhanced temporal motion vector prediction mode, and performing motion compensation on each sub-block in the current block based on the motion information of each sub-block in the current block, wherein, determining the motion information of each sub-block in the current block based on the determined enhanced temporal motion vector prediction mode, comprises:
  for any sub-block in a target matching block,
  if both forward motion information and backward motion information of the sub-block are available, scaling the forward motion information and the backward motion information of the sub-block to the first picture in reference picture List0 and the first picture in reference picture List1 respectively, and assigning the scaled forward motion information and the scaled backward motion information to a sub-block at a corresponding position in the current block; or
  if forward motion information of the sub-block is available but backward motion information of the sub-block is unavailable, scaling the forward motion information of the sub-block to the first picture in reference picture List0, and assigning the scaled forward motion information to a sub-block at a corresponding position in the current block; or
  if backward motion information of the sub-block is available but forward motion information of the sub-block is unavailable, scaling the backward motion information of the sub-block to the first picture in reference picture List1, and assigning the scaled backward motion information to a sub-block at a corresponding position in the current block, wherein a sequence parameter set level syntax is used to indicate whether the enhanced temporal motion vector prediction technology is enabled for the current block.

2. The decoding method according to claim 1, wherein the one or more new matching blocks obtained by offsetting each of the one or more matching blocks are determined by:
  for a respective matching block of the one or more matching blocks,
    based on one or more offset pairs, horizontally and vertically offsetting the respective matching block to obtain one or more new matching blocks.

3. The decoding method according to claim 1, wherein after the determining one or more matching blocks of the current block, the decoding method further comprises:
  clipping each of the one or more matching blocks to obtain one or more clipped matching blocks.

4. The decoding method according to claim 3, wherein the one or more new matching blocks obtained by offsetting each of the one or more matching blocks are determined by:
  for a respective clipped matching block of the one or more clipped matching blocks,
  comparing the motion information of a thirteenth sub-block and the motion information of a fourteenth sub-block, and comparing the motion information of a fifteenth sub-block and the motion information of a sixteenth sub-block, to obtain two comparing results, if at least one of the two comparing results indicates different in motion information, horizontally offsetting the clipped matching block rightward to obtain a new matching block; or
  comparing the motion information of a seventeenth sub-block and the motion information of an eighteenth sub-block, and comparing the motion information of a nineteenth sub-block and the motion information of a twentieth sub-block, to obtain two comparing results, if at least one of the two comparing results indicates different in motion information, horizontally offsetting the clipped matching block leftward to obtain a new matching block; or
  comparing the motion information of a thirteenth sub-block and the motion information of a twenty-first sub-block, and comparing the motion information of a seventeenth sub-block and the motion information of a twenty-second sub-block, to obtain two comparing results, if at least one of the two comparing results indicates different in motion information, vertically offsetting the clipped matching block downward to obtain a new matching block; or
  comparing the motion information of a fifteenth sub-block and the motion information of a twenty-third sub-block, and comparing the motion information of a nineteenth sub-block and the motion information of a twenty-fourth sub-block, to obtain two comparing results, if at least one of the two comparing results indicates different in motion information, vertically offsetting the clipped matching block upward to obtain a new matching block;
  wherein the thirteenth sub-block is a sub-block in an up-left side of the clipped matching block, the fourteenth sub-block is a first sub-block in a right side of the clipped matching block, the fifteenth sub-block is a sub-block in a down-left side of the clipped matching block, the sixteenth sub-block is a last sub-block in a right side of the clipped matching block, the seventeenth sub-block is a sub-block in an up-right side of the clipped matching block, the eighteenth sub-block is a first sub-block in a left side of the clipped matching block, the nineteenth sub-block is a sub-block in a down-right side of the clipped matching block, the twentieth sub-block is a last sub-block in a left side of the clipped matching block, the twenty-first sub-block is a first sub-block in a down side of the clipped matching block, the twenty-second sub-block is a last sub-block in a down side of the clipped matching block, the twenty-third sub-block is a first sub-block in an up side of the clipped matching block, and the twenty-fourth sub-block is a last sub-block in an up side of the clipped matching block.

5. The decoding method according to claim 2, wherein, determining the candidate enhanced temporal motion vector prediction modes based on the one or more matching blocks and the one or more new matching blocks obtained by offsetting each of the one or more matching blocks, comprises:
when there are one or more new matching blocks, determining, prediction modes corresponding to the one or more matching blocks before the offsetting and prediction modes corresponding to the one or more new matching blocks obtained by the offsetting, as the candidate enhanced temporal motion vector prediction modes.

6. The decoding method according to claim 1, wherein, determining the motion information of each sub-block in the current block based on the determined enhanced temporal motion vector prediction mode, further comprises:
if forward motion information and backward motion information of the sub-block in the target matching block are both unavailable,
when both forward motion information and backward motion information of a surrounding block of the current block are available, scaling the forward motion information and the backward motion information of the surrounding block to the first picture in reference picture List0 and the first picture in reference picture List1 respectively, and assigning the scaled forward motion information and the scaled backward motion information to a sub-block at a corresponding position in the current block; or
when forward motion information of the surrounding block is available, but backward motion information of the surrounding block is unavailable, scaling the forward motion information of the surrounding block to the first picture in reference picture List0, and assigning the scaled forward motion information to a sub-block at a corresponding position in the current block; or
when backward motion information of the surrounding block is available, but forward motion information of the surrounding block is unavailable, scaling the backward motion information of the surrounding block to the first picture in reference picture List1, and assigning the scaled backward motion information to a sub-block at a corresponding position in the current block; or
when forward motion information and backward motion information of the surrounding block are both unavailable, assigning zero motion information to a sub-block at a corresponding position in the current block.

7. The decoding method according to claim 1, wherein, when the sequence parameter set level syntax is used to indicate whether the enhanced temporal motion vector prediction technology is enabled for the current block, whether the enhanced temporal motion vector prediction technology is enabled for the current block is determined by:
when the enhanced temporal motion vector prediction technology is enabled for an image sequence to which the current block belongs, determining that the enhanced temporal motion vector prediction technology is enabled for the current block; or
when the enhanced temporal motion vector prediction technology is disabled for an image sequence to which the current block belongs, determining that the enhanced temporal motion vector prediction technology is disabled for the current block.

8. A non-volatile machine-readable storage medium having stored thereon machine-executable instructions that, when executed by a processor, implement the decoding method according to claim 1.

9. An encoding method, comprising:
determining one or more matching blocks of a current block, wherein the one or more matching blocks refer to one or more image blocks corresponding to the current block in a target reference picture, comprising:
determining one or more matching blocks of the current block at least based on a target reference picture index, a target reference direction and a position of the current block, wherein the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1;
determining candidate enhanced temporal motion vector prediction modes based on the one or more matching blocks and one or more new matching blocks obtained by offsetting each of the one or more matching blocks, and establishing a temporal candidate mode list based on the candidate enhanced temporal motion vector prediction modes;
traversing the candidate enhanced temporal motion vector prediction modes in the temporal candidate mode list, and for any of the candidate enhanced temporal motion vector prediction modes, determining motion information of each sub-block in the current block based on the candidate enhanced temporal motion vector prediction mode, and performing motion compensation on each sub-block in the current block based on the motion information of each sub-block in the current block,
wherein, determining the motion information of each sub-block in the current block based on the candidate enhanced temporal motion vector prediction mode, comprises:
for any sub-block in a target matching block,
if both forward motion information and backward motion information of the sub-block are available, scaling the forward motion information and the backward motion information of the sub-block to the first picture in reference picture List0 and the first picture in reference picture List1 respectively, and assigning the scaled forward motion information and the scaled backward motion information to a sub-block at a corresponding position in the current block; or
if forward motion information of the sub-block is available but backward motion information of the sub-block is unavailable, scaling the forward motion information of the sub-block to the first picture in reference picture List0, and assigning the scaled forward motion information to a sub-block at a corresponding position in the current block; or if backward motion information of the sub-block is available but forward motion information of the sub-block is unavailable, scaling the backward motion information of the sub-block to the first picture in reference picture List1, and assigning the scaled backward motion information to a sub-block at a corresponding position in the current block, determining, based on a rate-distortion cost corresponding to each candidate enhanced temporal motion vector prediction mode in the temporal candidate mode list, a candidate enhanced temporal motion vector prediction mode with a smallest rate-distortion cost as an enhanced temporal motion vector prediction mode of the current block;

carrying index information in a bit stream of the current block, wherein the index information is used to indicate a mode index of the determined enhanced temporal motion vector prediction mode.

10. An encoding device, comprising a processor and a machine-readable storage medium, wherein the machine-readable storage medium stores machine-executable instructions that can be executed by the processor, and the processor is configured to execute the machine-executable instructions to implement the encoding method according to claim 9.

11. A non-volatile machine-readable storage medium having stored thereon machine-executable instructions that, when executed by a processor, implement the encoding method according to claim 9.

12. A decoding device, comprising a processor and a machine-readable storage medium, wherein the machine-readable storage medium stores machine-executable instructions that can be executed by the processor, and the processor is configured to execute the machine-executable instructions to perform:

obtaining index information of an enhanced temporal motion vector prediction mode from a bit stream of a current block when it is determined that an enhanced temporal motion vector prediction technology is enabled for the current block;

determining one or more matching blocks of the current block, wherein the one or more matching blocks refer to one or more image blocks corresponding to the current block in a target reference picture, comprising:

determining one or more matching blocks of the current block at least based on a target reference picture index, a target reference direction and a position of the current block, wherein the target reference picture index is an index of a first picture in reference picture List0, and the target reference direction is a reference direction corresponding to reference picture List0; or, the target reference picture index is an index of a first picture in reference picture List1, and the target reference direction is a reference direction corresponding to reference picture List1;

determining candidate enhanced temporal motion vector prediction modes based on the one or more matching blocks and one or more new matching blocks obtained by offsetting each of the one or more matching blocks, and establishing a temporal candidate mode list based on the candidate enhanced temporal motion vector prediction modes;

based on the index information, determining the enhanced temporal motion vector prediction mode from the temporal candidate mode list;

determining motion information of each sub-block in the current block based on the determined enhanced temporal motion vector prediction mode, and performing motion compensation on each sub-block in the current block based on the motion information of each sub-block in the current block, wherein, determining the motion information of each sub-block in the current block based on the determined enhanced temporal motion vector prediction mode, comprises:

for any sub-block in a target matching block, if both forward motion information and backward motion information of the sub-block are available, scaling the forward motion information and the backward motion information of the sub-block to the first picture in reference picture List0 and the first picture in reference picture List1 respectively, and assigning the scaled forward motion information and the scaled backward motion information to a sub-block at a corresponding position in the current block; or if forward motion information of the sub-block is available but backward motion information of the sub-block is unavailable, scaling the forward motion information of the sub-block to the first picture in reference picture List0, and assigning the scaled forward motion information to a sub-block at a corresponding position in the current block; or if backward motion information of the sub-block is available but forward motion information of the sub-block is unavailable, scaling the backward motion information of the sub-block to the first picture in reference picture List1, and assigning the scaled backward motion information to a sub-block at a corresponding position in the current block, wherein a sequence parameter set level syntax is used to indicate whether the enhanced temporal motion vector prediction technology is enabled for the current block.

13. The decoding device according to claim 12, wherein the one or more new matching blocks obtained by offsetting each of the one or more matching blocks are determined by:

for a respective matching block of the one or more matching blocks, based on one or more offset pairs, horizontally and vertically offsetting the respective matching block to obtain one or more new matching blocks.

14. The decoding device according to claim 12, wherein after the determining one or more matching blocks of the current block, the processor is further configured to execute the machine-executable instructions to perform:

clipping each of the one or more matching blocks to obtain one or more clipped matching blocks.

15. The decoding device according to claim 14, wherein the one or more new matching blocks obtained by offsetting each of the one or more matching blocks are determined by:

for a respective clipped matching block of the one or more clipped matching blocks, comparing the motion information of a thirteenth sub-block and the motion information of a fourteenth sub-block, and comparing the motion information of a fifteenth sub-block and the motion information of a sixteenth sub-block, to obtain two comparing results, if at least one of the two comparing results indicates different in motion information, horizontally offsetting the clipped matching block rightward to obtain a new matching block; or comparing the motion information of a seventeenth sub-block and the motion information of an eighteenth sub-block, and comparing the motion information of a nineteenth sub-block and the motion information of a twentieth sub-block, to obtain two comparing results, if at least one of the two comparing results indicates different in motion information, horizontally offsetting the clipped matching block leftward to obtain a new matching block; or comparing the motion information of a thirteenth sub-block and the motion information of a twenty-first sub-block, and comparing the motion information of a seventeenth sub-block and the motion information of a twenty-second sub-block, to obtain two comparing results, if at least one of the two comparing results indicates different in motion information, vertically offsetting the clipped matching block downward to obtain a new matching block; or comparing the motion information of a fifteenth sub-block and the motion information of a twenty-third sub-block, and comparing the motion information of a nineteenth sub-block and the motion information of a twenty-fourth sub-block, to obtain two comparing results, if at least one of the two comparing results indicates different in motion information, vertically offsetting the clipped matching block upward to obtain a new matching block;

wherein the thirteenth sub-block is a sub-block in an up-left side of the clipped matching block, the fourteenth sub-block is a first sub-block in a right side of the clipped matching block, the fifteenth sub-block is a sub-block in a down-left side of the clipped matching block, the sixteenth sub-block is a last sub-block in a right side of the clipped matching block, the seventeenth sub-block is a sub-block in an up-right side of the clipped matching block, the eighteenth sub-block is a first sub-block in a left side of the clipped matching block, the nineteenth sub-block is a sub-block in a down-right side of the clipped matching block, the twentieth sub-block is a last sub-block in a left side of the clipped matching block, the twenty-first sub-block is a first sub-block in a down side of the clipped matching block, the twenty-second sub-block is a last sub-block in a down side of the clipped matching block, the twenty-third sub-block is a first sub-block in an up side of the clipped matching block, and the twenty-fourth sub-block is a last sub-block in an up side of the clipped matching block.

16. The decoding device according to claim 13, wherein, in determining the candidate enhanced temporal motion vector prediction modes based on the one or more matching blocks and the one or more new matching blocks obtained by offsetting each of the one or more matching blocks, the processor is further configured to execute the machine-executable instructions to perform:

when there are one or more new matching blocks, determining, prediction modes corresponding to the one or more matching blocks before the offsetting and prediction modes corresponding to the one or more new matching blocks obtained by the offsetting, as the candidate enhanced temporal motion vector prediction modes.

17. The decoding device according to claim 12, wherein, in determining the motion information of each sub-block in the current block based on the determined enhanced temporal motion vector prediction mode, the processor is further configured to execute the machine-executable instructions to perform:

if forward motion information and backward motion information of the sub-block in the target matching block are both unavailable, when both forward motion information and backward motion information of a surrounding block of the current block are available, scaling the forward motion information and the backward motion information of the surrounding block to the first picture in reference picture List and the first picture in reference picture List1 respectively, and assigning the scaled forward motion information and the scaled backward motion information to a sub-block at a corresponding position in the current block; or when forward motion information of the surrounding block is available, but backward motion information of the surrounding block is unavailable, scaling the forward motion information of the surrounding block to the first picture in reference picture List0, and assigning the scaled forward motion information to a sub-block at a corresponding position in the current block; or when backward motion information of the surrounding block is available, but forward motion information of the surrounding block is unavailable, scaling the backward motion information of the surrounding block to the first picture in reference picture List1, and assigning the scaled backward motion information to a sub-block at a corresponding position in the current block; or when forward motion information and backward motion information of the surrounding block are both unavailable, assigning zero motion information to a sub-block at a corresponding position in the current block.

18. The decoding device according to claim 12, wherein, when the sequence parameter set level syntax is used to indicate whether the enhanced temporal motion vector prediction technology is enabled for the current block, whether the enhanced temporal motion vector prediction technology is enabled for the current block is determined by:

when the enhanced temporal motion vector prediction technology is enabled for an image sequence to which the current block belongs, determining that the enhanced temporal motion vector prediction technology is enabled for the current block; or when the enhanced temporal motion vector prediction technology is disabled for an image sequence to which the current block belongs, determining that the enhanced temporal motion vector prediction technology is disabled for the current block.

* * * * *